(12) United States Patent
Kim et al.

(10) Patent No.: US 8,129,211 B2
(45) Date of Patent: Mar. 6, 2012

(54) DYE-SENSITIZED SOLAR CELL COMPRISING METAL OXIDE NANOBALL LAYER AND PREPARATION METHOD THEREOF

(75) Inventors: Dong Young Kim, Seoul (KR); Seong Mu Jo, Seoul (KR); Sung-Yeon Jang, Daegu (KR); Byung-Hong Lee, Busan (KR); Hyun-Ju Kim, Incheon (KR)

(73) Assignee: Korea Institute of Science and Technology, Seoul (KR)

( * ) Notice: Subject to any disclaimer, the term of this patent is extended or adjusted under 35 U.S.C. 154(b) by 255 days.

(21) Appl. No.: 12/574,230

(22) Filed: Oct. 6, 2009

(65) Prior Publication Data
US 2010/0084008 A1    Apr. 8, 2010

(30) Foreign Application Priority Data
Oct. 8, 2008  (KR) .......................... 10-2008-0098683

(51) Int. Cl.
*H01L 21/00* (2006.01)
(52) U.S. Cl. ................... 438/63; 257/E31.004; 977/811
(58) Field of Classification Search .................... 438/63; 257/E31.004; 977/811
See application file for complete search history.

(56) References Cited

U.S. PATENT DOCUMENTS
2004/0067358 A1    4/2004   Kim
2007/0116640 A1    5/2007   Kim et al.
2007/0261959 A1   11/2007   Kim et al.
2008/0115829 A1    5/2008   Lee et al.

*Primary Examiner* — Bradley K Smith
*Assistant Examiner* — Amar Movva
(74) *Attorney, Agent, or Firm* — Ladas & Parry LLP

(57) ABSTRACT

A dye-sensitized solar cell comprising a semiconductor electrode prepared by spraying a metal oxide nanoparticle dispersion on a conductive substrate using an electric field to form a metal oxide nanoball layer which is composed of agglomerated metal oxide nanoparticles and has a high porosity and specific surface area, exhibits improved photoelectric properties even when a gel or solid electrolyte is used.

20 Claims, 12 Drawing Sheets

Diameter 178-650 nm

Diameter 750-930 nm

Diameter 1450-1920 nm 300 nm

Diameter 750-930nm 300 nm

DYE-SENSITIZED SOLAR CELL COMPRISING METAL OXIDE NANOBALL LAYER AND PREPARATION METHOD THEREOF

FIELD OF THE INVENTION

The present invention relates to a high-efficiency dye-sensitized solar cell comprising a mesoporous metal oxide layer composed of agglomerated metal oxide nanoparticles, and a preparation method thereof.

BACKGROUND OF THE INVENTION

A dye-sensitized solar cell was first developed by M. Gratzel, et al. [B. O'Regan, M. Gratzel, *Nature*, 1991, 737, 353] and its metal oxide semiconductor electrode comprises a photosensitive dye capable of absorbing visible light to generate electron-hole pairs and nanocrystalline titanium oxide particles, an n-type semiconductor, that can transfer the generated electrons, the dye being regenerated by an electrochemical oxidation-reduction reaction of "$I^-/I_3^-$" contained in a liquid electrolyte, thereby generating an electric current.

Such a dye-sensitized solar cell may possibly be manufactured in a more cost-effective manner than other solar cells such as a monocrystalline silicon solar cell, an amorphous silicon solar cell, and a chemical compound semiconductor solar cell, and, for that reason, it has been regarded as a next-generation solar cell. However, the photo-energy conversion efficiency of the conventional dye-sensitized solar cell is lower than those of the silicon solar cell and the chemical compound semiconductor solar cell.

One of the methods to solve the above-mentioned problem is to enhance the light absorption efficiency of a metal oxide layer to obtain a high short-circuit current density (Jsc), e.g., by increasing the amount of a dye adsorbed on the metal oxide layer so that the dye can efficiently absorb incident light. In a typical dye-sensitized solar cell, the metal oxide layer is made porous to have an increased surface area. Such a porous titanium oxide layer is prepared by dispersing in ethanol 10 to 50 nm-sized anatase crystalline titanium oxide particles produced by hydrothermal synthesis of titanium alkoxide, adding an organic polymer or oligomer binder to produce a paste, and coating the paste on a transparent conductive substrate, followed by sintering. This process can be performed by various thin film formation methods such as roller coating, air knife coating, blade coating, wire bar coating, slide hopper coating, extrusion, curtain coating, spin coating, spray coating, offset coating, gravure printing, screen printing, and wet printing [Japanese Patent Publication No. 2006-286528A.]

Further, in order to maximize the light absorption by increasing the number of light absorbing channels, a titanium oxide precursor is treated with a surfactant to form a mixture using a sol-gel process, and then, the mixture is subjected to a hydrothermal reaction to form a scattering layer composed of porous titanium oxide particles having a particle size of several tens to several hundreds of nanometers [*Journal of Colloid and Interface Science*, 2007, 316, 85-91.]

However, the conventional methods using an organic binder have a problem in that the short-circuit current density deteriorates due to the increases in the interfacial inter-particle resistance and the particle-substrate interface resistance. Further, after the organic binder is removed by drying and sintering procedures, the resulting titanium oxide layer often undergoes cracking, and the inter-particle resistance increases. Moreover, the titanium oxide layer formed by the conventional method has a very dense structure and a low porosity so that a high-viscosity electrolyte such as a solid or quasi-solid electrolyte cannot easily penetrate the titanium oxide layer, resulting in a drastic decrease in the photoelectric conversion efficiency.

There has recently been developed an electrospray method for forming a porous titanium oxide layer composed of nanocrystalline titanium oxide particles. Such an electrospray method has been used in the field of electrostatic coating, to form a compact and uniform film on a substrate by the electrostatic force in a high-voltage electric field. For example, a uniform nanoparticle layer may be formed on a substrate by electrospraying a metal oxide nanoparticle dispersion on a substrate in a high-voltage electric field [see *J. Electrochemical Society*, 2006, 153(5), A826-A829.] However, the nanoparticle layer prepared by this method has a high density, a low porosity and a small pore size (about 10 nm or less), so that a high-viscosity electrolyte cannot easily penetrate the resulting nanoparticle layer, leading to an extremely low photoelectric conversion efficiency when used in a gel-type electrolyte or a solid state electrolyte.

A plastic substrate is preferred as a substrate for a semiconductor electrode in the preparation of a dye-sensitized solar cell due to its flexibility and light weight. However, when a plastic substrate is used, high-temperature sintering cannot be performed so that a metal oxide layer coated on a substrate becomes easily detached from the substrate and its electron transport efficiency becomes low. Further, the metal oxide particles incompletely bonds together, thus decreasing the photoelectric conversion efficiency.

Therefore, it is required to develop a metal oxide layer having a high specific surface area, a high porosity, and a large pore size, which has excellent contact properties even after a low-temperature sintering process and has a low interfacial resistance, a high electron transport efficiency, and a high photoelectric conversion efficiency, even when a gel or solid electrolyte is used.

SUMMARY OF THE INVENTION

Accordingly, it is an object of the present invention to provide a method of preparing a dye-sensitized solar cell which exhibits excellent photoelectric properties even when a gel electrolyte or a solid electrolyte is used, which comprises a semiconductor electrode having a high porosity and a low interface resistance even after a low-temperature sintering process, the preparation being conducted without any added organic binder.

In accordance with one aspect of the present invention, there is provided a method for preparing a dye-sensitized solar cell, comprising the steps of preparing a semiconductor electrode, preparing a counter electrode, and charging an electrolyte between said two electrodes, wherein the preparation of the semiconductor electrode comprises: (a) preparing a metal oxide dispersion by dispersing metal oxide nanoparticles in an organic solvent in an amount of 0.01 to 5 wt %, without any added organic binder; (b) electrospraying the metal oxide dispersion on a conductive substrate to form metal oxide nanoballs having an average diameter of 50 to 3000 nm and a specific surface area of 70 to 300 $m^2/g$ which are agglomerated metal oxide nanoparticles disposed on the conductive substrate; (c) thermal-pressing the conductive substrate coated with the metal oxide nanoballs at a temperature of 50 to 200° C. under a pressure of 0.1 to 25 tons per 100 $cm^2$, which is heat-treated at a temperature of 100 to 700° C. to prepare a metal oxide nanoball layer formed on the conductive substrate; and (d) conducting the absorption of a dye on the metal oxide nanoball layer.

In accordance with another aspect of the present invention, there is provided a dye-sensitized solar cell prepared by the inventive method, comprising a semiconductor electrode, a counter electrode, and an electrolyte charged between said two electrodes, wherein the semiconductor electrode has a metal oxide nanoball layer comprising mesoporous nanoballs which are agglomerated metal oxide nanoparticles and have an average diameter of 50 to 3000 nm and a specific surface area of 70 to 300 $m^2/g$.

The dye-sensitized solar cell prepared according to the inventive method can remarkably improve a photoelectric conversion efficiency since it has a high dye adsorptivity and an excellent electron transport ability due to a mesoporous metal oxide nanoball layer which is composed of agglomerated metal oxide nanoparticles and has a high specific surface area, and can maintain a high photoelectric conversion efficiency even when using a gel or solid electrolyte due to the high porosity of the mesoporous metal oxide nanoball layer.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
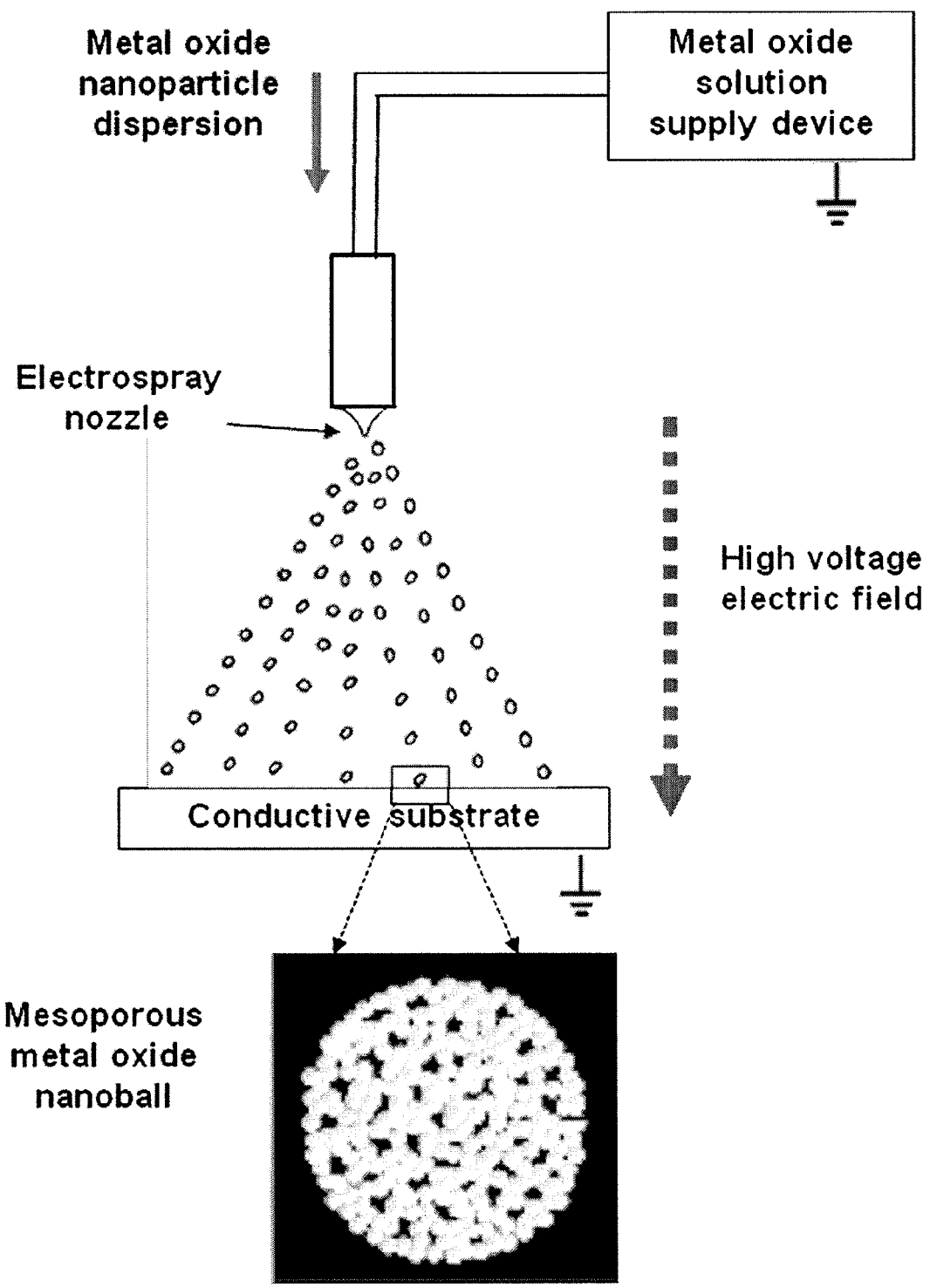
FIG. 1: a schematic view of the inventive electrospray method for preparing a layer of metal oxide nanoballs on a conductive substrate.

A method for preparing a dye-sensitized solar cell includes the steps of: preparing a semiconductor electrode; preparing a counter electrode; and assembling the two electrodes and introducing an electrolyte therebetween. The steps of preparing a counter electrode, assembling the two electrodes, and introducing an electrolyte therebetween may be performed according to conventional methods. The gist of present invention is the step of preparing an improved semiconductor electrode, which is described in detail as follows.

The metal oxide nanoparticles used to prepare said semiconductor electrode may be nanoparticles of a metal oxide selected from the group consisting of titanium oxide, zinc oxide, tin oxide, niobium oxide, tungsten oxide, strontium oxide, zirconium oxide, and a mixture thereof, among which, titanium oxide nanoparticles are most preferable.

Further, the metal oxide nanoparticles may have an average diameter of 1 to 50 nm, an aspect ratio of 1 to 100 and a specific surface area of 10 to 300 $m^2/g$, and may be selected from among mesoporous nanoparticles, hollow nanoparticles, nanorods, nanotubes, nanofibers, and a mixture thereof. Mesoporous nanoparticles (pore size: 2-10 nm) having an average diameter of 5 to 20 nm and a high specific surface area of 50 to 250 $m^2/g$ are preferably used, to form metal oxide nanoballs having a high specific surface area and mesopores. When such mesoporous nanoparticles are used, the problem of the conventional method for manufacturing dye-sensitized solar cell having a low photoelectric conversion efficiency due to high contact resistance between particles can be resolved due to the fact that the amount of the photosensible dye is markedly enhance. Further, when metal oxide nanorods are used, the photoelectric conversion efficiency can be improved due to excellent electron transfer properties thereof. Furthermore, synergetic effects can be obtained when using a mixture of mesoporous nanoparticles and metal oxide nanorods.

The metal oxide nanoparticles used in the present invention can be prepared by various conventional methods.

A hydrothermal method can efficiently prepare metal oxide nanoparticles having various shapes, such as nanorods, nanotubes, nanofibers, etc. In the hydrothermal method, the shape of nanoparticles can be controlled by adjusting reaction temperature and time. For example, in order to slow down the hydrolysis and condensation reactions of titanium butoxide $(Ti(OBu)_4)$, titanium butoxide and acetylacetone are mixed, and then, a suitable amount of water is added thereto with stirring. After ammonia water is added thereto, the resulting mixture is put into a high-pressure Teflon-lined stainless steel reactor and then subjected to a reaction at a predetermined temperature for a predetermined time. As a result, titanium oxide nanoparticles, titanium oxide nanorods, or titanium oxide nanosheets are obtained depending on reaction temperature and reaction time.

Further, mesoporous titanium oxide nanoparticles having a high specific surface area can be prepared by conducting a sol-gel process using a surfactant followed by sintering the resulting product. Further, hollow titanium oxide nanoparticles can be prepared by mixing a surfactant (PEG-400) with an aqueous potassium titanium oxalate solution and then putting the resulting mixture into a high-pressure Teflon-lined stainless steel reactor followed by conducting a hydrothermal reaction. Further, titanium oxide nanotubes can be prepared by various methods such as a hydrothermal method, and, titanium oxide nanofibers can be prepared by a hydrothermal method using rutile sand followed by a sintering process.

Furthermore, metal oxide nanoparticles and nanorods may be prepared by electrospinning a mixed solution of a metal oxide precursor and a polymer. For example, metal oxide nanoparticles and nanorods may be prepared by electrospinning a mixed solution of a polymer and titanium alkoxide which is a precursor of titanium oxide. In this method, the mixed solution are electrospun, extruded and then sintered, to obtain titanium oxide nanofibers composed of titanium oxide nanorods and nanoparticles having an average diameter of 10 to 20 nm [Korean Patent Laid-open Publication No. 10-2009-0022181.]

However, methods of preparing metal oxide nanoparticles used in the present invention are not limited thereto, and the metal oxide nanoparticles can be prepared using various methods.

According to the present invention, the metal oxide nanoparticles are dispersed in an organic solvent to prepare a dispersion for fabricating the inventive semiconductor electrode.

The dispersion used in the present invention may be prepared using a solvent comprising ethanol. Preferably, the dispersion may be prepared using a mixed solvent composed of ethanol mixed with a solvent having a dielectric constant less than that of ethanol and a boiling point of 80 to 150° C., particularly butanol, e.g., tertiary butanol, in a weight ratio of 1:3 to 3:1.

Figure 8A:
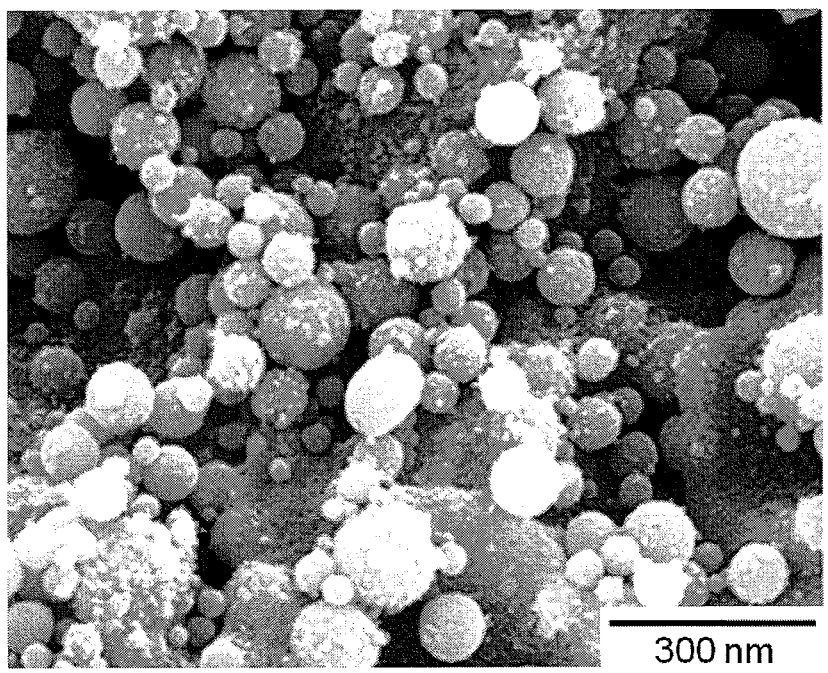
FIGS. 8A and 8B: morphologies of the titanium oxide nanoballs prepared in Comparative Example 12 and Example 11, respectively.
Figure 8B:
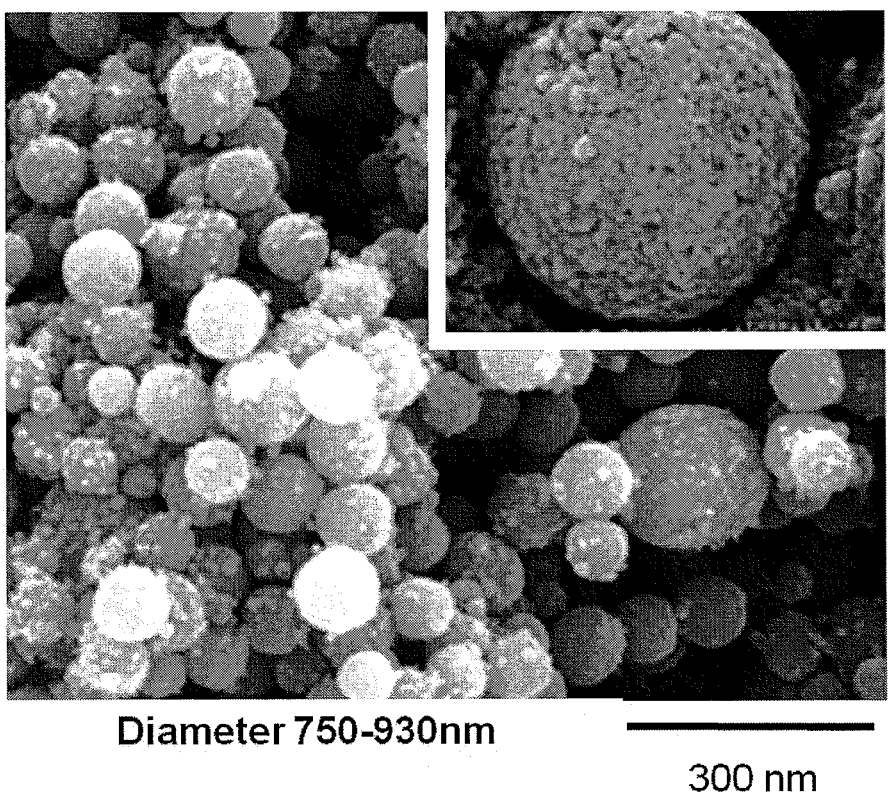

When such mixed solvent is used as a solvent, mesoporous metal oxide nanoballs may be easily formed compared to when water, alcohol or a mixed solvent of water and alcohol is used as a solvent. For example, when a mixed solvent comprising 25 wt % or more of butanol is used as a solvent, mesoporous metal oxide nanoballs may be mostly formed and accumulated in an electrode, and, as the amount of butanol increases, mesoporous metal oxide nanoballs may be formed as a main component and their distribution may become uniform. FIGS. 8A and 8B are morphologies showing metal oxide nanoballs prepared using only ethanol and using a mixed solvent of ethanol and butanol, respectively. It can be seen from FIGS. 8A and 8B that metal oxide nanoballs prepared using a mixed solvent have more uniform diameters than metal oxide nanoballs prepared using only ethanol.

Metal oxide nanoparticles easily agglomerate during dispersing such that their diameter becomes several hundreds of nanometers (nm) to several micrometers (μm). In order to pulverize such agglomerated nanoparticles, a sonication method or a mechanical stirring method is generally used. However, the dispersion prepared using such methods cannot achieve a good uniformity so that resulting nanoballs cannot have a sufficient mesoporosity.

In the preparation of the mesoporous nanoballs, agglomerated metal oxide nanoparticles need to be completely pulverized to a primary nanoparticle. For this purpose, the metal oxide nanoparticles may be dispersed in the organic solvent uniformly using a micro bead mill. The dispersing process using a micro bead mill can prepare a very homogeneous dispersion which does not make a precipitation even though it is left standing for several months.

The amount of the metal oxide nanoparticles in the dispersion may be 0.01 to 10 wt %, preferably 0.1 to 5 wt %, based on the total weight of the dispersion. Generally, the size of nanoballs increases as the amount of the metal oxide nanoparticles increases. When the amount is 10 wt % or more, there may be a problem in that nanoballs easily have a diameter of 3000 nm or more. Preferably, the amount of the metal oxide nanoparticles in the dispersion may be 3 wt % or less so that the nanoballs can have a diameter on the submicrometer scale. When the amount is 0.1 wt % or less, there may be problems in that the productivity is decreased and the solvent is easily volatilized.

In contrast to a conventional method, the inventive method does not use any organic binder, but use only an organic solvent, in the preparation of the metal oxide nanoparticle dispersion. As a result, the metal oxide layer is resistant to the generation of cracks during drying and sintering, thus providing a high photoelectric conversion efficiency.

In the inventive method, the metal oxide nanoparticle dispersion prepared by the hydrothermal method may be used as a dispersion for spraying without an additional process such as preparing them in the powder form, or may be used after conducting a solvent substitution for the titanium oxide nanoparticles.

The metal oxide nanoparticle dispersion prepared by the above procedures is used to manufacture a semiconductor electrode of the present invention using various methods in which they are sprayed on a conductive substrate using an electric field.

The conductive substrate used in the present invention may be a conductive glass substrate, a transparent conductive plastic substrate or a metal substrate. The conductive glass substrate or the transparent conductive plastic substrate may be a plastic substrate coated with a conductive thin film. Examples of the conductive thin film may be an ITO (indium tin oxide) thin film, an FTO (F-doped $SnO_2$) thin film or an ITO thin film coated with ATO (antimony tin oxide) or FTO. When a metal substrate is used as the conductive substrate, light should be transmitted toward a counter electrode (anode) composed of a transparent conductive substrate since light cannot penetrate the metal substrate.

According to the present invention, a metal oxide semiconductor layer may be formed by spraying a metal oxide nanoparticle dispersion onto the conductive substrate. Preferably, the metal oxide semiconductor layer may be formed using an electrospray method in which a high-voltage electric field is applied between a spray nozzle and a conductive substrate.

FIG. 1 shows a schematic view of the inventive electrospray method for preparing a layer of metal oxide nanoballs on a conductive substrate. According to the method, a metal oxide nanoparticle dispersion is supplied to a spray nozzle and a high-voltage electric field is applied between a spray nozzle and a conductive substrate, and then, the dispersion is sprayed onto a conductive substrate in the state of being atomized into ultramicroscopic drops. While the ultramicroscopic drops are applied onto the conductive substrate, an organic solvent is rapidly volatilized, and the metal oxide nanoparticles dispersed in the ultramicroscopic drops agglomerate very strongly because of the electrostatic attractive force, so that the metal oxide nanoparticles are formed into mesoporous metal oxide nanoballs, which are accumulated on the conductive substrate. These mesoporous metal oxide nanoballs have a strong cohesive force so that they are not disintegrated into primary metal oxide nanoparticles even when they are redispersed in a solution using ultrasonic waves.

Figure 3:
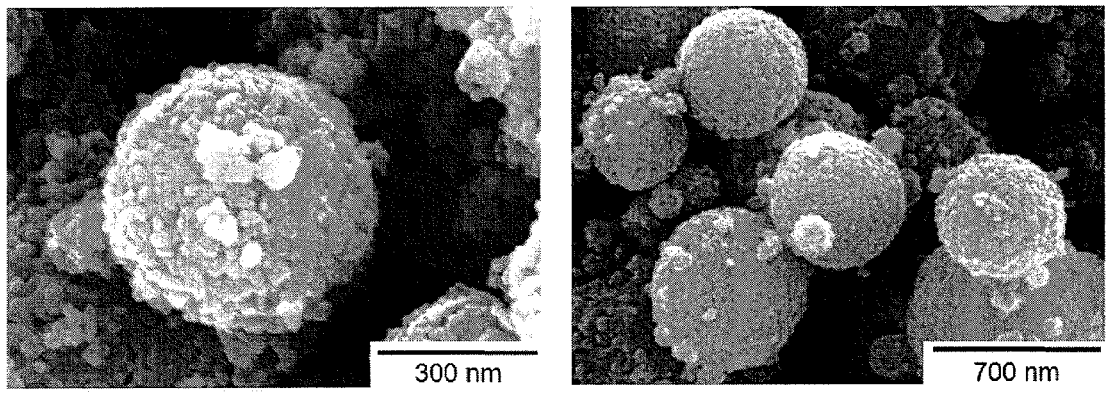
FIG. 3: morphologies of the mesoporous titanium oxide nanoballs prepared in Example 1.
Figure 3:
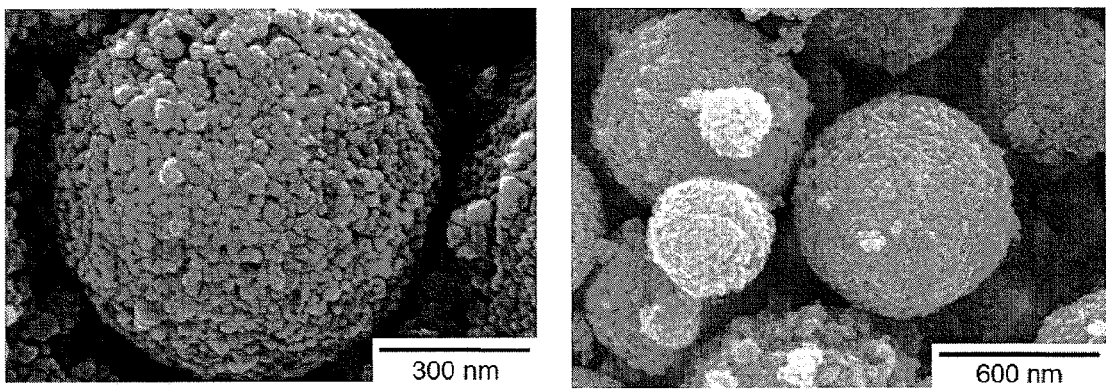
Figure 3:
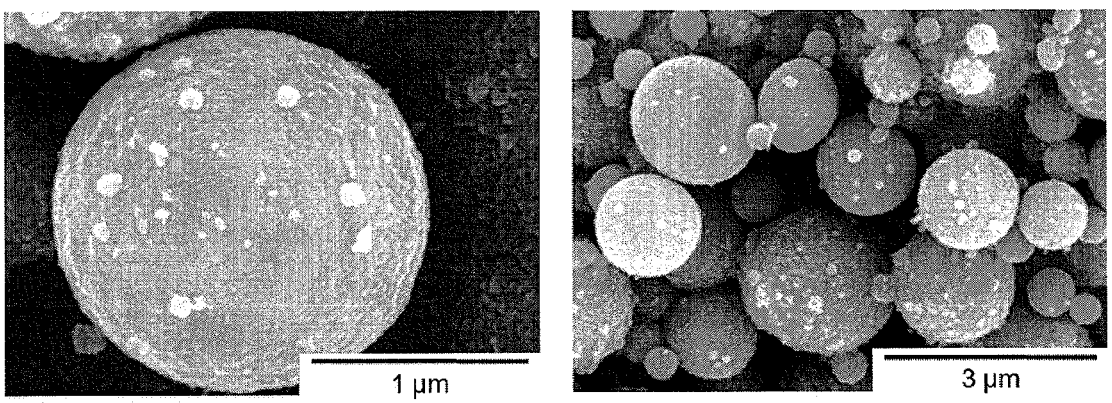
Figure 4:
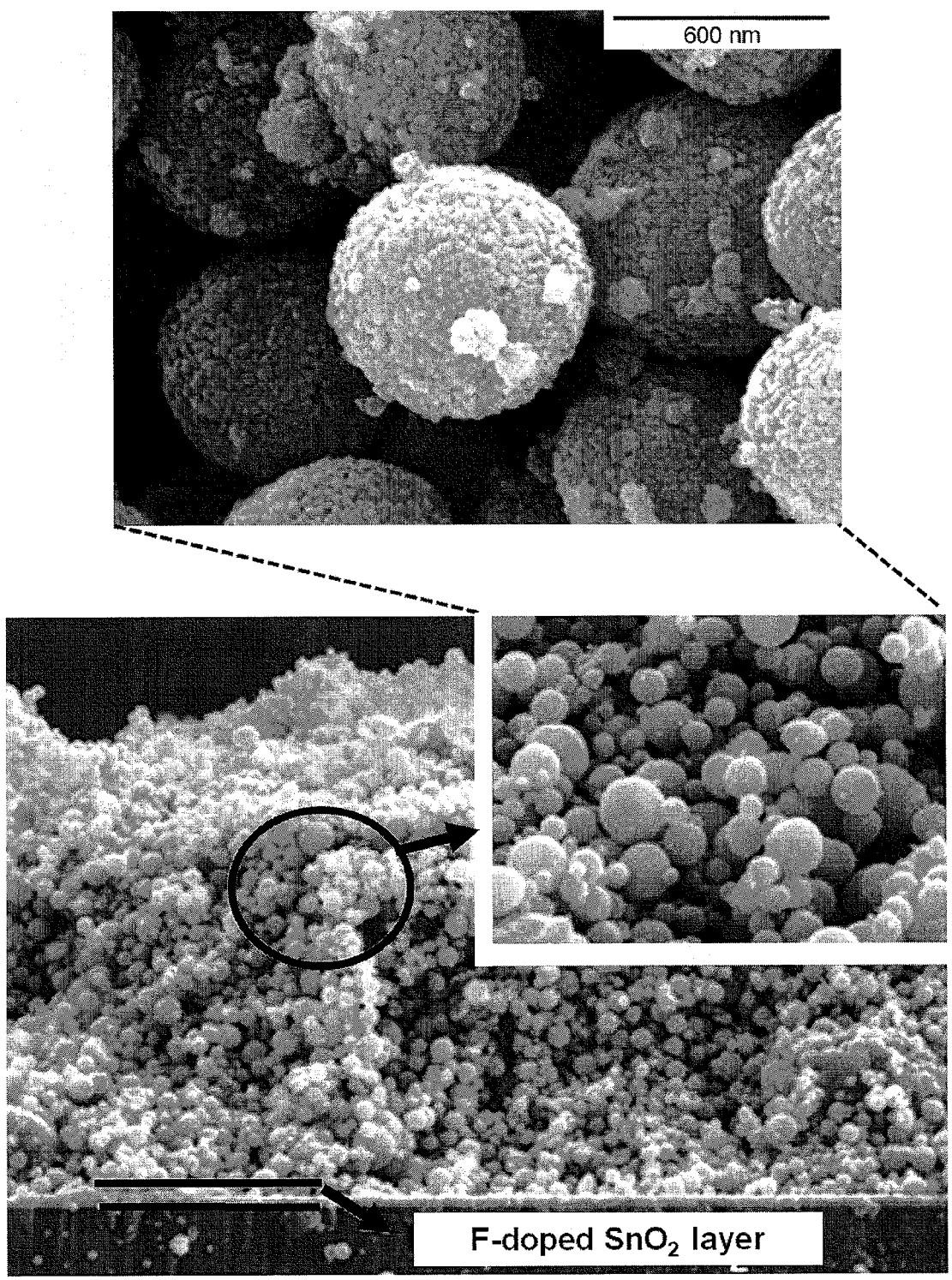
FIG. 4: morphologies of the titanium oxide nanoball layer prepared in Example 1.

FIG. 3 shows morphologies of the metal oxide nanoballs formed on a conductive substrate according to the present invention. As shown in FIG. 3, the metal oxide nanoballs of the present invention have mesopores, micropores and nanopores due to apertures between metal oxide nanoparticles and the pores of the metal oxide nanoparticles themselves. FIG. 4 shows morphologies of a metal oxide nanoball layer composed of the mesoporous metal oxide nanoballs. As shown in FIG. 4, the metal oxide nanoball layer of the present invention has mesoporous property due to the apertures between metal oxide nanoballs and the pores of the metal oxide nanoballs themselves.

The size and distribution of the metal oxide nanoballs are influenced by the organic solvent of the dispersion and its concentration. The metal oxide nanoballs of the present invention have an average diameter of 50 to 3000 nm, preferably 50 to 1000 nm, more preferably 50 to 600 nm, and have a specific surface area of 70 to 300 $m^2/g$. Further, the porosity of the metal oxide nanoball layer of the present invention may be 70 to 90%. When the substrate is a conductive glass substrate or a metal substrate, the thickness of the metal oxide nanoball layer may be 5 to 25 μm. When the substrate is a transparent conductive plastic substrate, the thickness of the metal oxide nanoball layer may be 5 to 15 μm.

Figure 7A:
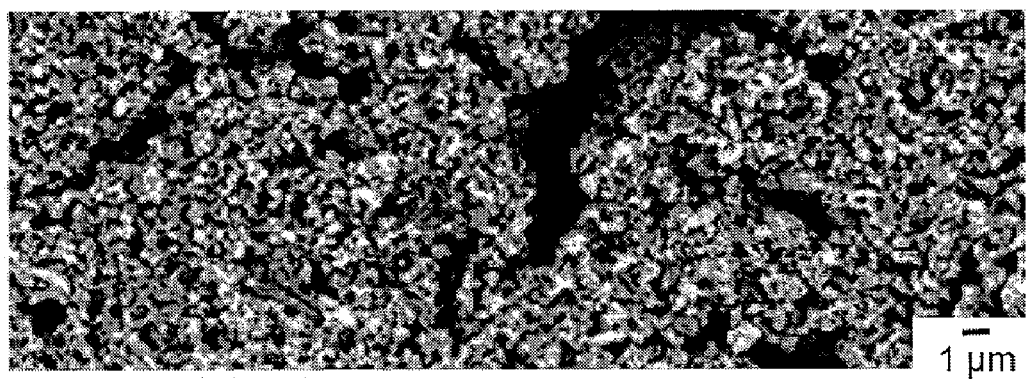
FIGS. 7A and 7B: morphologies of the titanium oxide layers prepared in Comparative Example 1 and Example 1, respectively.
Figure 7B:
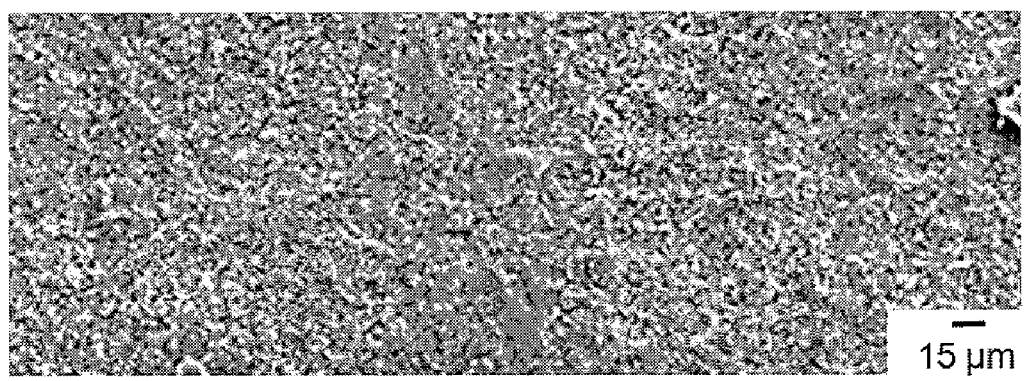

FIGS. 7A and 7B are morphologies of metal oxide layers formed by a conventional method and the inventive method, respectively. From FIGS. 7A and 7B, it can be seen that the metal oxide layer formed by a conventional method is cracked and non-uniform, whereas the metal oxide nanoball layer formed by the inventive method is not cracked and uniform. This results from that the inventive metal oxide nanoballs are agglomerated and accumulated on a conductive substrate by electrostatic attractive force through an electrospray method using a dispersion in which metal oxide nanoparticles are uniformly dispersed by a micro bead mill using only an organic solvent without any added organic binder.

As described above, the metal oxide layer of the present invention has a high porosity and a high specific surface area so that its dye adsorptivity and photoelectric properties are very excellent.

In addition to the above electrospray method, the metal oxide layer of the present invention may be formed by various methods in which a dispersion is sprayed on a conductive substrate using an electric field. For example, the metal oxide layer may be formed by an electro-blown method in which a dispersion is sprayed on a conductive substrate together with air during an electrospray procedure, or a flash spinning method in which a dispersion is sprayed on a conductive substrate together with a high-volatility solvent using an electric field.

According to an embodiment of the present invention, a blocking layer may be formed between the conductive substrate and the mesoporous metal oxide nanoball layer. The blocking layer serves to improve the contact property between the conductive substrate and the metal oxide layer and to improve energy conversion efficiency by facilitating electron transfer from the metal oxide layer to the conductive substrate and by controlling the emission of electrons from the conductive substrate.

The mesoporous metal oxide nanoball layer formed by the above procedures is then thermally pressed and heat-treated.

The thermal press of the mesoporous metal oxide nanoball layer is conducted at a temperature of 50 to 200° C. under a pressure of 0.1 to 25 tons per 100 cm². The thermal press gives the metal oxide nanoball layer a suitable porosity, and improves the contact property between nanoparticles and the adhesive force between the metal oxide nanoball layer and the conductive substrate.

The thermally pressed metal oxide nanoball layer is then heat-treated at a temperature of 100 to 700° C. The heat-treatment may be conducted at a temperature of 400 to 700° C. when the substrate is made of a conductive glass or metal, or at a temperature of 100 to 250° C. when the substrate is made of a transparent conductive plastic. The heat-treatment may improve the adhesive forces between metal oxide particles and between the nanoball layer and the substrate to form a stable metal oxide semiconductor layer, and it may improve the electron transfer ability to increase a photoelectric conversion efficiency. The heat-treatment may be performed by using ultraviolet rays or microwaves.

These thermal pressing and heat-treating processes can improve the adhesive forces between the metal oxide nanoball layer and the conductive substrate and between the metal oxide nanoballs, and can increase the porosity of the metal oxide nanoball layer, resulting in a decrease in the interfacial contact resistance and dye adsorptivity. Further, a light can easily penetrates the metal oxide nanoball layer even when using a gel or solid electrolyte having a high viscosity, thus increasing the photoelectric conversion efficiency.

In order to increase short-circuit current density (Jsc), the metal oxide layer may be composed of an anatase titanium oxide layer and a rutile titanium oxide layer coated thereon. The coating may be conducted by adsorbing titanium chloride ($TiCl_4$) into an anatase titanium oxide layer followed by sintering. An anatase titanium oxide layer prepared in a conventional manner cannot be easily coated with a rutile titanium oxide layer since it is difficult to penetrate the compact structure of the metal oxide layer. In contrast, the metal oxide nanoball layer according to the present invention can be stably coated with a rutile titanium oxide layer (see FIG. 6), so as to improve a dye adsorption, light scattering properties, and photoelectric current density.

The titanium oxide nanoball layer which is thermally pressed and heat-treated is then formed into a semiconductor electrode by adsorbing a dye thereon. For example, a mesoporous titanium oxide nanoball layer formed on a conductive substrate is immersed in an ethanol solution in which ruthenium dye molecules (N719 of $3\times10^{-4}$ M) are dissolved for 12 hours or more, thus allowing the metal oxide nanoball layer to adsorb a dye. Then, it was washed with ethanol and dried to prepare a dye-adsorbed semiconductor electrode. The dye may be an organic dye such as a ruthenium dye or a coumarine dye, but the present invention is not limited thereto.

The above-mentioned processes for preparing an improved semiconductor electrode is a gist part of the inventive method for preparing a dye-sensitized solar cell, and the other processes of preparing a counter electrode, assembling the two electrodes and introducing an electrolyte may be conducted according to conventional methods.

The counter electrode may be prepared by forming a platinum layer onto a transparent plastic substrate or a glass substrate which is coated with ITO or FTO. Instead of the platinum layer, the coating layer may be selected from the group consisting of a carbon particle layer, a carbon nanofiber layer, a carbon nanotube layer, a graphene monolayer, a graphene multilayer (20 layers or less, a thickness of 5 nm or less), a conductive polymer layer, and a combination thereof.

The inventive semiconductor electrode (cathode) and the counter electrode (anode) may be assembled such that their conductive surfaces face each other. In this case, it is preferred that the anode and cathode is attached to each other at a temperature of 120° C., placing a spacer between the two electrodes. The spacer may have a thickness of about 20 μm and may be made of thermoplastic Surlyn (Du Pont Co., Ltd.) The spacer serves to prevent the short circuiting between the anode and the cathode by controlling the thickness of the spacer such that the thickness of the spacer is greater than the distance between the electrodes, and also serves to prevent the electrolyte from leaking. For example, a porous separator film may be provided between the cathode and anode.

Then, an electrolyte such as a liquid electrolyte, a polymer-gel electrolyte or a solid electrolyte is charged in the space between the two electrodes. The liquid electrolyte may be prepared by dissolving hexyldimethylimidazolium iodine, guanidine thiocyanate, iodine and quaternary butylpyridine in a mixed solution of acetonitrile and valeronitrile. The polymer-gel electrolyte may be selected from the group consisting of polyvinylidenefluoride-co-polyhexafluoropropylene, polyacrylonitrile, polyethylene oxide and polyalkylacrylate. Further, the polymer-gel electrolyte may be prepared by adding these polymers to the liquid electrolyte such that the amount of the polymer in the liquid electrolyte is 5 to 20 parts by weight based on 100 parts by weight of the liquid electrolyte. Furthermore, the charged electrolyte may be sealed using a spacer in order to prevent the leakage of the electrolyte.

A dye-sensitized solar cell prepared according to the inventive method includes a semiconductor electrode, a counter electrode, and an electrolyte charged between the two electrodes, wherein the semiconductor electrode has a metal oxide nanoball layer comprising mesoporous nanoballs which are agglomerated metal oxide nanoparticles and have an average diameter of 50 to 3000 nm and a specific surface area of 70 to 300 $m^2/g$.

The metal oxide nanoball layer may have a porosity of 70 to 90%.

Figure 2:
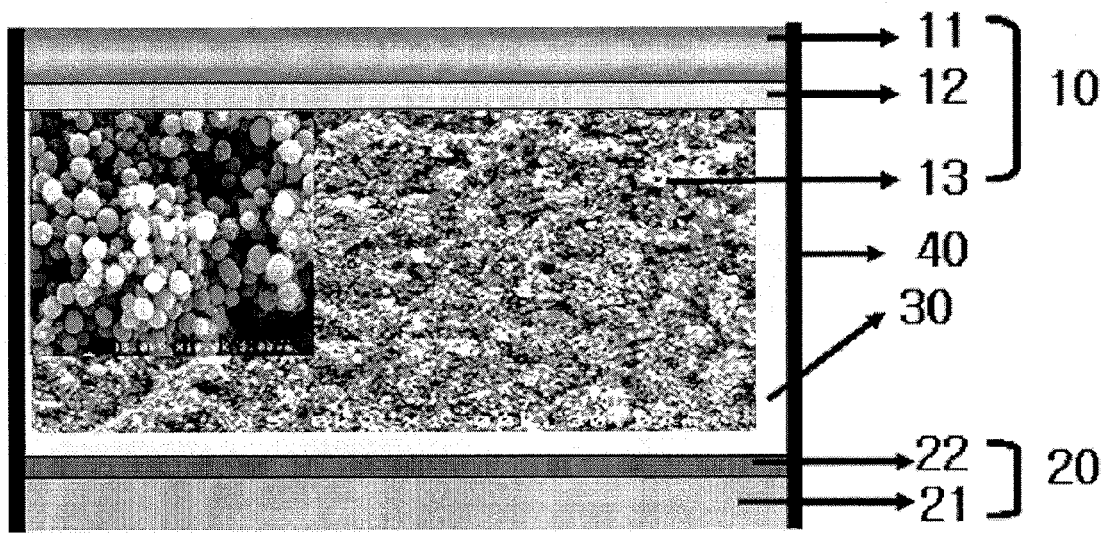
FIG. 2: a schematic view of a cross section of an embodiment of the inventive dye-sensitized solar cell.

FIG. 2 shows a schematic view of a cross section of an embodiment of the inventive dye-sensitized solar cell, which includes a semiconductor electrode 10, a counter electrode 20, an electrolyte 30 charged therebetween, and a spacer 40.

The semiconductor electrode 10, a cathode, includes a mesoporous metal oxide nanoball layer 13, in which metal oxide nanoparticles agglomerates on a conductive substrate 11 and a dye is adsorbed thereon. Further, a blocking layer 12 may be provided between the conductive substrate 11 and the mesoporous metal oxide nanoball layer 13.

The counter electrode 20, an anode, may include a platinum layer 22 formed on a conductive substrate 21. Instead of the platinum layer 22, the coating layer may be selected from the group consisting of a carbon particle layer, a carbon nanofiber layer, a carbon nanotube layer, a graphene monolayer, a graphene multilayer, a conductive polymer layer or a combination thereof.

An electrolyte 30 is charged in the space between the two electrodes 10 and 20 and in the pores of the metal oxide nanoball layer 13. The charged electrolyte 30 may be sealed with a spacer 40 in order to prevent the leakage of the electrolyte. Further, in order to prevent the short circuiting between the anode and the cathode, a porous separator film may be provided between the cathode and the anode.

As described above, the dye-sensitized solar cell according to the present invention can remarkably improve a photoelectric conversion efficiency since it has a high dye adsorptivity and an excellent electron transport ability due to a mesoporous metal oxide nanoball layer which is agglomerated metal oxide nanoparticles and has a high specific surface area, and can maintain a high photoelectric conversion efficiency even when using a gel or solid electrolyte due to the high porosity of the mesoporous metal oxide nanoball layer.

Further, the inventive method can form a mesoporous metal oxide nanoball layer efficiently and economically without any added organic binder since the metal oxide nanoball layer is formed by a strong adhesive force between the metal oxide nanoparticles without an additional process due to a rapid volatilization of the solvent from the metal oxide dispersion during spraying using an electric field.

Furthermore, the inventive semiconductor electrode has high adhesive forces between the metal oxide nanoballs and between the metal oxide nanoball and a conductive substrate regardless of a low-temperature sintering process due to a thermal pressing, and maintains low interfacial resistances between nanoparticles and between mesoporous nanoballs, thus providing a high electron transport efficiency.

EXAMPLES

The following Examples are intended to further illustrate the present invention without limiting its scope.

Preparation of Titanium Oxide Layer Formed on Conductive Glass Substrate

Comparative Example 1

12 wt % of titanium oxide nanopowder (P-25, Degussa Co., Ltd., Germany) having a diameter of 20 nm and a specific surface area of 54 $m^2/g$ was uniformly dispersed in water using a ball mill and ultrasonic waves, and then, 20 parts by weight of PEG and 15 parts by weight of PEO were added thereto as a binder, based on 100 parts by weight of the titanium oxide, so as to prepare a paste. The paste was applied onto a conductive glass substrate using a doctor blade method to form a paste film, which was heat-treated at 500° C. to form a titanium oxide layer having a thickness of 12.4 µm.

Comparative Example 2

12 wt % of titanium oxide nanopowder (P-25, Degussa Co., Ltd., Germany) having a diameter of 20 nm and a specific surface area of 54 $m^2/g$ was uniformly dispersed in water using a ball mill and ultrasonic waves to prepare a paste. The paste was applied onto a conductive glass substrate using a doctor blade method to form a paste film, which was heat-treated at 500° C. to obtain a titanium oxide layer having a thickness of 12.5 µm.

Comparative Example 3

A titanium oxide layer having a thickness of 12.5 µm was obtained under the same conditions as Comparative Example 2, except for using a metal oxide paste (Ti-Nanoxide D, Solaronix Co., Ltd., Switzerland) which comprises an organic binder and 11 wt % of titanium oxide nanopowder having a diameter of 13 nm and a specific surface area of 120 $m^2/g$ dispersed in a mixed solvent of water and ethanol.

Example 1

3 wt % of titanium oxide nanopowder (P-25, Degussa Co., Ltd., Germany) having a diameter of 20 nm and a specific surface area of 54 $m^2/g$ was uniformly dispersed in a mixed solvent of ethanol and butanol (weight ratio of 1:1) using a micro bead mill to prepare a dispersion. The dispersion was applied onto a conductive glass substrate using an electrospray method, to obtain titanium oxide nanoballs which are agglomerated titanium oxide nanoparticles accumulated on the substrate and have an average diameter of 750 to 1500 µm. Then, the substrate comprising the titanium oxide nanoballs was heat-treated at 500° C. for about 30 min to form a titanium oxide nanoball layer having a thickness of 12.4 µm.

Example 2

A titanium oxide nanoball layer having a thickness of 12.4 µm was formed under the same conditions as Example 1, except that the substrate comprising the titanium oxide nanoballs was thermally pressed under a pressure of 5.5 tons (5×5 cm) at 120° C. for about 30 min followed by heat-treating at 500° C. for about 30 min.

Example 3

A high-density blocking layer was coated on a transparent conductive substrate by spin-coating the transparent conductive substrate (10×10 cm) with a butanol solution containing 2M titanium bis(ethylacetoacetato)diisopropoxide (99.9%, $C_{18}H_{34}O_8Ti$, Aldrich Co., Ltd.) at 200 rpm for 60 seconds using a spin coater (Spin-3000D, PTL Korea Co., Ltd.) followed by sintering the resulting substrate at 450° C. for 30 min. A titanium oxide nanoball layer was formed on the obtained blocking layer under the same conditions as Example 2.

Example 4

A titanium oxide nanoball layer having a thickness of 12.5 µm was formed under the same conditions as Example 2, except that the dispersion is prepared by uniformly dispersing 1 wt % of titanium oxide nanopowder (P-25, Degussa Co., Ltd., Germany) having a diameter of 20 nm and a specific surface area of 54 m$^2$/g in the mixed solvent of ethanol and butanol using a micro bead mill.

Example 5

A titanium oxide nanoball layer prepared under the same conditions as Example 4 was immersed in an aqueous 0.05 M TiCl$_4$ solution and then reacted at 40° C. for 4 hours. The resulting titanium oxide nanoball layer was washed with deionized water, dried, and then heat-treated at 500° C. for 30 min, to obtain a titanium oxide nanoball layer coated with a rutile titanium oxide layer.

Example 6

Titanium butoxide and acetyl acetone were mixed at a weight ratio of 1:1, and then, 40 mL of water was slowly dropped into the mixture with stirring. The resulting mixture was subjected to a hydrothermal reaction in a high-pressure reactor at 130° C. to prepare a mesoporous titanium oxide nanopowder (pore size: 4-5 nm) having a diameter 9.6 nm and a specific surface area of 195 m$^2$/g.

A titanium oxide nanoball layer was formed under the same conditions as Example 5, except that the mesoporous titanium oxide nanopowder was used as the metal oxide nanoparticle, so as to prepare a titanium oxide nanoball layer having a thickness of 13.3 µm which consists of an anatase titanium oxide nanoball layer and a rutile titanium oxide layer coated thereon, the nanoballs having an average diameter of 200 to 750 nm.

Example 7

60 g of titanium isopropoxide and 24 g of acetic acid were slowly dropped into a polymer solution in which 20 g of polyvinyl acetate (PVAc, Mw 500,000, Aldrich Co., Ltd.) was dissolved in 350 mL of dimethylformamide to prepare a spinning solution. The spinning solution was electrospun on a grounded metal plate to form a PVAc/TiO$_2$ composite fiber layer. The PVAc/TiO$_2$ composite fiber layer was pressed under a pressure of about 1.5 tons at 120° C. for 10 min, and then sintered at 500° C. for 30 min with removing the polymer to form anatase titanium oxide nanorods having a diameter of 10 to 15 nm and a length of 10 to 100 nm.

A titanium oxide nanoball layer was formed under the same conditions as Example 5, except that the dispersion for electrospraying was prepared by uniformly dispersing 1 wt % of the anatase titanium oxide nanorods obtained above in the mixed solvent of ethanol and butanol using a micro bead mill, so as to prepare a titanium oxide nanoball layer having a thickness of 14 µm which comprises a titanium oxide nanoball layer composed of agglomerations of the anatase titanium oxide nanorods and a rutile titanium oxide layer coated thereon.

Example 8

A titanium oxide nanoball layer was formed under the same conditions as Example 5, except for using a mixture of the mesoporous titanium oxide nanopowder prepared in Example 6 and the anatase titanium oxide nanorods prepared in Example 7 in a weight ratio of 1:1 as the metal oxide nanoparticles, so as to prepare a titanium oxide nanoball layer having a thickness of 14.0 µm which consists of an anatase titanium oxide nanoball layer and a rutile titanium oxide layer coated thereon, the nanoballs having an average diameter of 200 to 750 nm.

Preparation of Titanium Oxide Layer Formed on Conductive Plastic Substrate

Comparative Example 11

20 parts by weight of titanium tetraisopropoxide paste, based on the 100 parts by weight of titanium oxide, was slowly dropped into a metal oxide paste (Ti-Nanoxide D, Solaronix Co., Ltd., Switzerland) which comprises an organic binder and 11 wt % of titanium oxide nanopowder having a diameter of 13 nm and a specific surface area of 120 m$^2$/g dispersed in a mixed solvent of water and ethanol.

The resulting mixture was stirred for about 30 min, and then applied on a conductive PEN substrate which has a surface resistance of 20Ω/using a doctor blade method to form a paste film. The paste film was heat-treated at 200° C. for about 30 min to obtain a titanium oxide layer having a thickness of 6.1 µm.

Comparative Example 12

1 wt % of titanium oxide nanopowder (P-25, Degussa Co., Ltd., Germany) having a diameter of 20 nm and a specific surface area of 54 m$^2$/g was uniformly dispersed in ethanol using a ball mill and ultrasonic waves to prepare a paste. The paste was coated on a conductive PEN substrate having a surface resistance of 20Ω/using an electrospray method, to obtain a high-density titanium oxide nanopowder layer. The high-density titanium oxide nanopowder layer was heat-treated at 150° C. for 30 min to obtain a titanium oxide layer having a thickness of 12.0 µm.

Example 11

1 wt % of titanium oxide nanopowder (P-25, Degussa Co., Ltd., Germany) having a diameter of 20 nm and a specific surface area of 54 m$^2$/g was uniformly dispersed in a mixed solvent of ethanol and butanol (weight ratio of 1:1) using a micro bead mill to prepare a dispersion. The dispersion was applied onto a conductive PEN substrate having a surface resistance of 20Ω/using an electrospray method, to obtain titanium oxide nanoballs which are agglomerated titanium oxide nanoparticles accumulated on the substrate. Then, the substrate comprising the titanium oxide nanoballs was heat-treated at 150° C. for 30 min to obtain a titanium oxide nanoball layer having a thickness of 12.4 µm.

Example 12

The titanium oxide nanoball layer having a thickness of 12.3 µm was formed under the same conditions as Example 11, except that the substrate comprising the titanium oxide nanoballs was thermally pressed under a pressure of 5.3 tons (5×5 cm) at 120° C. for about 30 min followed by heat-treating at 150° C. for about 30 min.

Example 13

A titanium oxide nanoball layer having a thickness of 12.4 µm was formed under the same conditions as Example 12, except that the heat-treatment was conducted at 200° C. for about 30 min.

Example 14

A titanium oxide nanoball layer having a thickness of 13.2 µm was formed under the same conditions as Example 13, except that the mesoporous titanium oxide nanopowder prepared in Example 6 was used as a metal oxide nanopowder and a transparent conductive PEN substrate having a surface resistance of 15Ω/was used as a conductive substrate.

The procedures of Examples 1 to 14 and Comparative Examples 1 to 12 are summarized in Tables 1 and 2.

TABLE 1

| Glass substrate | | | | Process | | | | | |
|---|---|---|---|---|---|---|---|---|---|
| Electrolyte | No | Nano-particle | Solvent | Dispersion (wt %) | Dispersing method | Organic binder | Coating method | Thermal press | Sintering (° C.) | Other |
| Liquid | Comp. Ex. 1 | P-25[1] | water | 12 | ball mill | ○ | paste | — | 500 | — |
| | Comp. Ex. 2 | P-25 | water | 12 | ball mill | — | paste | — | 500 | — |
| | Comp. Ex. 3 | Ti-nanoxide[2] | water/EtOH | 11 | — | ○ | paste | — | 500 | — |
| | Ex. 1 | P-25 | EtOH/BuOH | 3 | micro bead mill | — | electro-spray | — | 500 | — |
| | Ex. 2 | P-25 | EtOH/BuOH | 3 | micro bead mill | — | electro-spray | ○ | 500 | — |
| | Ex. 3 | P-25 | EtOH/BuOH | 3 | micro bead mill | — | electro-spray | ○ | 500 | blocking layer |
| | Ex. 4 | P-25 | EtOH/BuOH | 1 | micro bead mill | — | electro-spray | ○ | 500 | — |
| | Ex. 5 | P-25 | EtOH/BuOH | 1 | micro bead mill | — | electro-spray | ○ | 500 | rutile layer |
| | Ex. 7 | nanorods | EtOH/BuOH | 3 | micro bead mill | — | electro-spray | ○ | 500 | rutile layer |
| Gel | Ex. 6 | meso[3] | EtOH/BuOH | 1 | micro bead mill | — | electro-spray | ○ | 500 | rutile layer |
| | Ex. 7 | nanorods | EtOH/BuOH | 3 | micro bead mill | — | electro-spray | ○ | 500 | rutile layer |
| | Ex. 8 | meso + nanorods | EtOH/BuOH | 1 | micro bead mill | — | electro-spray | ○ | 500 | rutile layer |

[1]P-25: titanium oxide nanopowder, Degussa Co., Ltd., Germany.
[2]Ti-Nanoxide D: a metal oxide paste, Solaronix Co., Ltd., Switzerland.
[3]meso: mesoporous nanoparticles.

TABLE 2

| Plastic substrate | | | | Process | | | | | |
|---|---|---|---|---|---|---|---|---|---|
| Electrolyte | No | Nano-particle | Solvent | Dispersion (wt %) | Dispersing method | Organic binder | Coating method | Thermal press | Sintering (° C.) |
| Liquid | Comp. Ex. 11 | Ti-nanoxide[1] | water/EtOH | 11 | — | ○ | paste | — | 200 |
| | Comp. Ex. 12 | P-25[2] | EtOH | 1 | ball mill | — | electro-spray | — | 150 |
| | Ex. 11 | P-25 | EtOH/BuOH | 1 | micro bead mill | — | electro-spray | — | 150 |
| | Ex. 12 | P-25 | EtOH/BuOH | 1 | micro bead mill | — | electro-spray | ○ | 150 |
| | Ex. 13 | P-25 | EtOH/BuOH | 1 | micro bead mill | — | electro-spray | ○ | 200 |
| | Ex. 14 | meso[3] | EtOH/BuOH | 1 | micro bead mill | — | electro-spray | ○ | 200 |

TABLE 2-continued

| Plastic substrate Electrolyte | Nano-particle No | Solvent | Process | | | | | |
|---|---|---|---|---|---|---|---|---|
| | | | Dispersion (wt %) | Dispersing method | Organic binder | Coating method | Thermal press | Sintering (° C.) |
| Gel | Comp. Ex. 11 | Ti-nanoxide | water/EtOH | 11 | — | ○ | paste | — | 200 |
| | Comp. Ex. 12 | P-25 | EtOH | 1 | ball mill | — | electro-spray | — | 150 |
| | Ex. 14 | meso | EtOH/BuOH | 1 | micro bead mill | — | electro-spray | ○ | 200 |

[1]Ti-Nanoxide D: a metal oxide paste, Solaronix Co., Ltd., Switzerland.
[2]P-25: titanium oxide nanopowder, Degussa Co., Ltd., Germany.
[3]meso: mesoporous nanoparticles.

Evaluation of Physical Properties of Titanium Oxide Layer

The physical properties of the titanium oxide layers prepared in Comparative Examples 1 to 12 and Examples 1 to 14 were evaluated as follows.

1. Morphology of a Titanium Oxide Layer

Morphologies of samples were obtained using a field emission scanning electron microscope (FE-SEM, model: HITACHIS-4100) and a high-resolution transmission electron microscope (HR-TEM, model: JEOLJEM-2000EXII).

FIGS. 3 and 4 show the morphologies of the titanium oxide nanoballs prepared in Example 1 and a titanium oxide layer formed by accumulating these titanium oxide nanoballs, respectively. It can be seen from FIG. 3 that titanium oxide nanoparticles were strongly agglomerated by electrostatic attractive force to form mesoporous titanium oxide nanoballs. It can be seen from FIG. 4 that these mesoporous titanium oxide nanoballs were accumulated on a substrate to form a titanium oxide nanoball layer.

Figure 5:
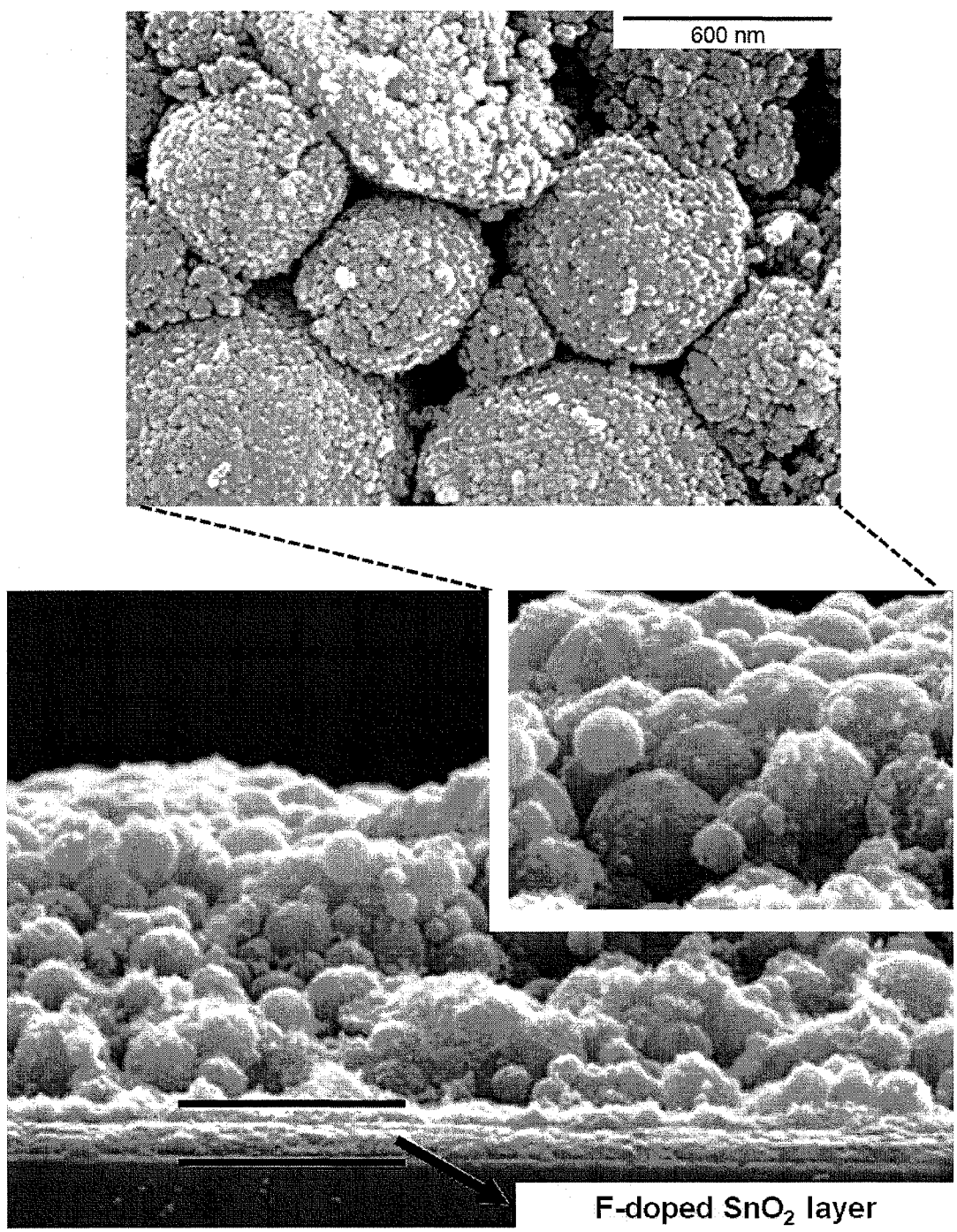
FIG. 5: morphologies of the titanium oxide nanoball layer prepared in Example 2.

FIG. 5 shows the morphologies of the titanium oxide nanoball layer prepared in Example 2. It can be seen from FIG. 5 that a thermal pressing process increases the adhesive forces between a metal oxide nanoball layer and a conductive substrate and between metal oxide nanoballs and improves the porosity of the metal oxide nanoball layer suitably.

Figure 6:
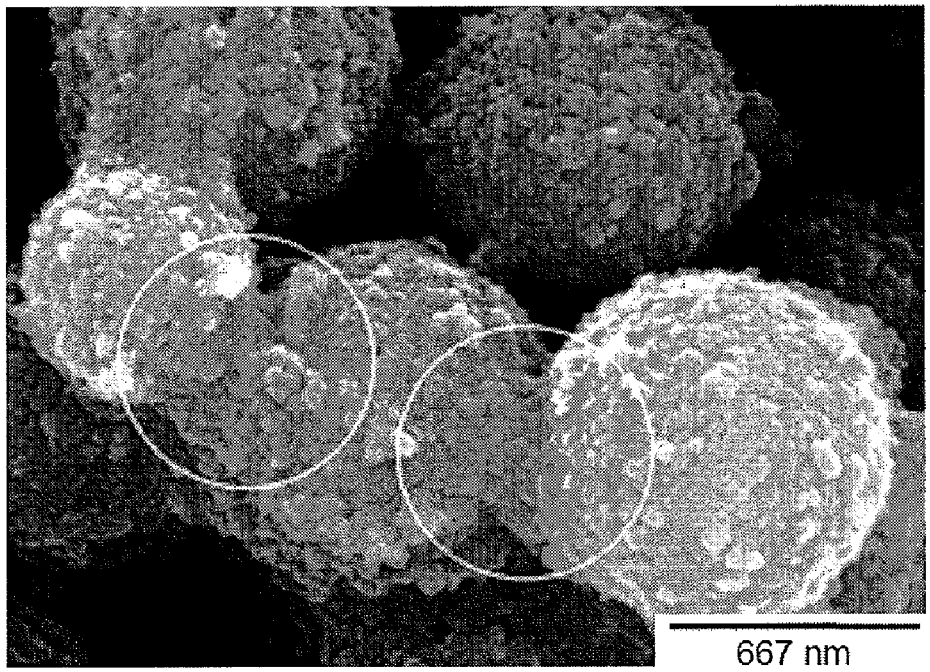
FIG. 6: morphologies of the titanium oxide nanoball layer prepared in Example 5.
Figure 6:
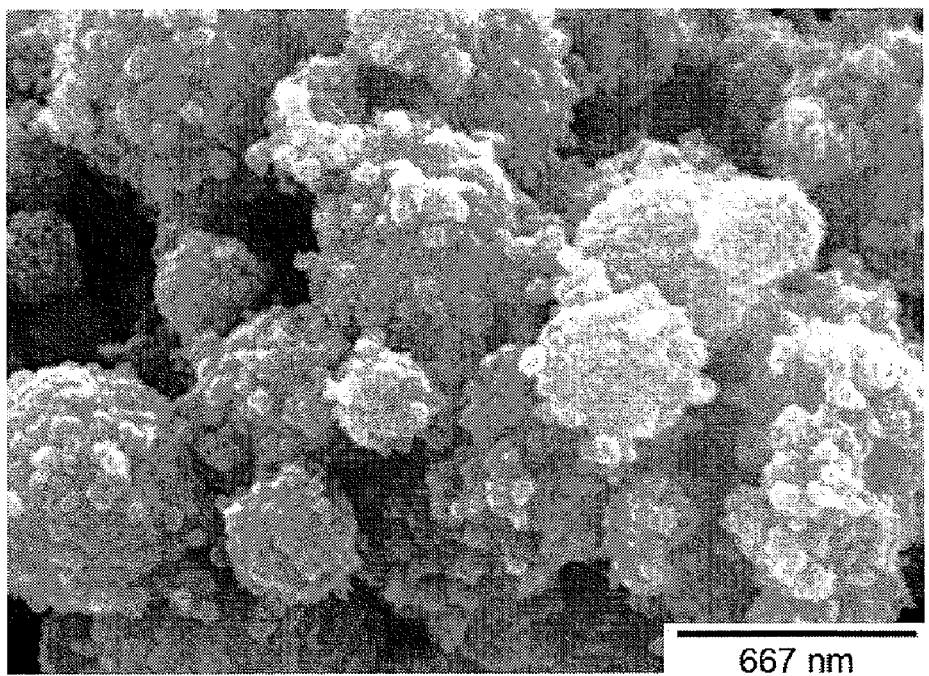

FIG. 6 shows the morphologies of the titanium oxide layer prepared in Example 5. It can be seen from FIG. 6 that an anatase titanium oxide layer was coated with a rutile titanium oxide layer.

FIGS. 7A and 7B show the morphologies of the titanium oxide layers prepared in Comparative Example 1 and Example 1, respectively. It can be seen from FIGS. 7A and 7B that the metal oxide layer formed by a conventional method is cracked and non-uniform, whereas the metal oxide nanoball layer formed by the inventive method is not cracked and uniform.

FIGS. 8A and 8B show the morphologies of the titanium oxide layers prepared in Comparative Example 12 and Example 11, respectively. It can be seen from FIGS. 8A and 8B that titanium oxide nanoballs have more uniform diameters when a mixed solvent of ethanol and butanol was used as an organic solvent.

2. Evaluation of Properties of Titanium Oxide Layer (1) Density

The density of the titanium oxide layers was determined by the ratio of weight per volume of the titanium oxide layer.

(2) Porosity

The porosity of the titanium oxide layers was determined by the following equation:

Porosity (%) = $[(V - V_{TiO_2})/V] \times 100$

Wherein, V is the total volume (thickness×area) of the titanium oxide layer, $V_{TiO_2}$ is the volume of the titanium oxide which is determined from the density of titanium crystals and the weight of titanium oxide included in the titanium oxide layer, and the thickness of the titanium oxide layer was measured using a surface profiler (model: TENCOR.P-10.)

(3) Specific Surface Area

The specific surface area of the titanium oxide layer was measured using a BET surface analyzer (model: Sorptomatic 1990.)

(4) Dye Adsorption Amount

The dye adsorption amounts of the samples were determined by the methods disclosed in the documents "J. Solid State Chemistry, 2005, 178, 1044" and "J. Phys. Chem. B, 2003, 107, 8981." First, the UV absorbance of a solution containing a predetermined concentration of dye was measured to determine a calibration curve between UV absorbance and dye concentration. Using the calibration curve, the UV absorbance of samples and the dye adsorption amounts of samples were determined.

The evaluation results thereof are given in Table 3 below.

TABLE 3

| | Titanium oxide layer | | |
|---|---|---|---|
| | Porosity (%) | Specific surface area (m²/g) | Dye adsorption amount (1 × 10⁻⁵ mol/g) |
| Comp. Ex. 1 | 70 | 56 | 5.80 |
| Comp. Ex. 2 | 52 | 54 | 4.71 |
| Comp. Ex. 3 | 65 | 65 | 5.23 |
| Ex. 1 | 79 | 76.7 | 6.12 |
| Ex. 6 | 83 | 182 | 10.9 |
| Ex. 7 | 81 | 118 | 10.7 |

From Table 3, it can be seen that the titanium oxide layers prepared in Examples 1, 6 and 7 have a higher porosity and a higher specific surface area than the titanium oxide layers prepared in Comparative Examples 1 to 3, and thus the dye adsorptivity of the titanium oxide layers prepared in Examples 1, 6 and 7 is more excellent than that of the titanium oxide layers prepared in Comparative Examples 1 to 3.

Figure 9:
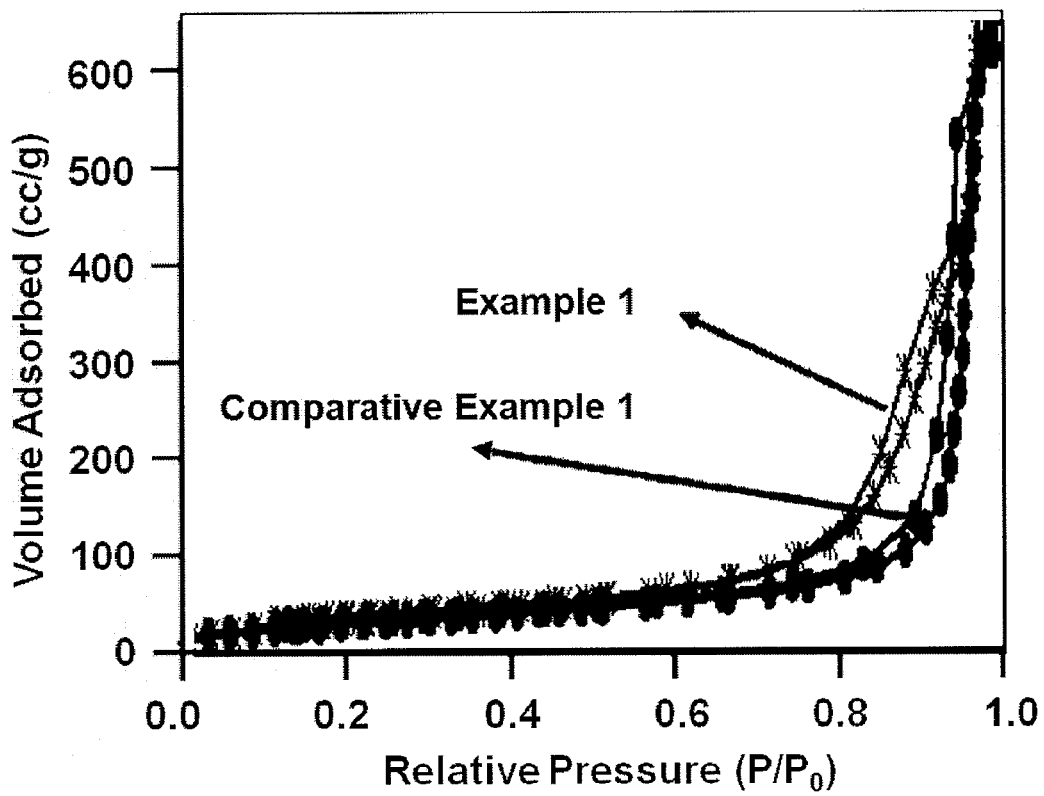
FIG. 9: the specific surface area and mesoporosity of the titanium oxide layers prepared in Comparative Example 1 and Example 1.
Figure 9:
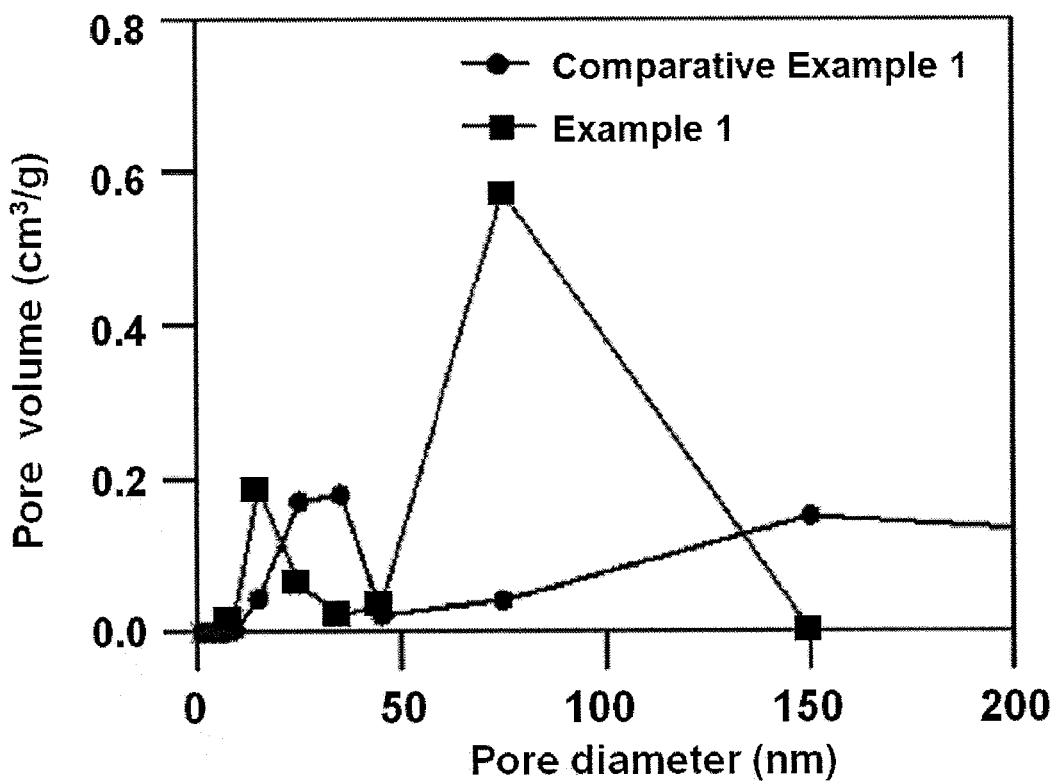

FIG. 9 shows the specific surface area and mesoporosity of the titanium oxide layers prepared in Example 1 and Comparative Example 1. It can be seen from FIG. 9 that the titanium oxide layer of Comparative Example 1 has a pore size of 1 to 50 nm, whereas the titanium oxide layer of Example 1 has a pore size of 1 to 40 nm and a mesopore size of 50 to 150 nm. The pores and mesopores are due to the gaps between nanoballs so that an electrolyte more easily penetrates the titanium oxide layer. Therefore, it can be seen that

| | Porosity (%) | Specific surface area ($m^2/g$) | Dye adsorption amount ($1 \times 10^{-5}$ mol/g) | the porosity and specific surface area of the titanium oxide nanoball layer according to the present invention is higher than those of the titanium oxide layer of Comparative Example 1.

Preparation of Dye-Sensitized Solar Cell

Dye-sensitized solar cells were prepared using a liquid electrolyte or a gel electrolyte together with the titanium oxide layers prepared in Comparative Examples 1 to 12 and Examples 1 to 14, respectively.

(1) Preparation of Dye-Sensitized Solar Cell Using Liquid Electrolyte

A substrate including each of the titanium oxide layers prepared in Comparative Examples 1 to 12 and Examples 1 to 14 was immersed in an ethanol solution in which a ruthenium dye (N719) was dissolved in a concentration of $3\times10^{-4}$ M for 12 hours to allow the substrate to adsorb the ruthenium dye, and then, the dye-adsorbed substrate was washed with ethanol and dried several times to prepare a dye-adsorbed semiconductor electrode.

A counter electrode was prepared by applying a platinum layer on a transparent conductive substrate coated with FTO.

The semiconductor electrode and the counter electrode were attached to each other by slightly pressing them at 120° C. in a state in which a spacer having a thickness of about 20 μm is interposed between the two electrodes. A liquid iodine electrolyte was charged in the space between the two electrodes and then sealed, so as to prepare a dye-sensitized solar cell. Herein, the liquid iodine electrolyte was prepared by dissolving 0.6 M hexyldimethylimidazolium iodine, 0.1 M guanidine thiocyanate, 0.03 M iodine and 0.3 M quaternary butylpyridine in a mixed solution of acetonitrile and valeronitrile (volume ratio of 4:1.)

(2) Preparation of Dye-Sensitized Solar Cell Using Gel Electrolyte

A dye-sensitized solar cell was prepared in the same manner as the preparation of a dye-sensitized solar cell using the liquid electrolyte, except that a gel electrolyte was charged instead of the liquid iodine electrolyte, the gel electrolyte being prepared by dissolving 10 parts by weight of poly (vinylidenefluoride)-co-poly(hexafluoropropylene) in the liquid electrolyte based on the 100 parts by weight of the liquid electrolyte.

Evaluation of Photoelectric Properties of Dye-Sensitized Solar Cell

The photoelectric properties of the dye-sensitized solar cells prepared in the above process were measured using a light source measuring unit (model name: Keithley 2400, Keithley Co., Ltd., USA) and a solar simulator Xe lamp (1000 W, Yamashita Denso Co., Ltd.) as a light source. The light intensity of samples was controlled by AM-1.5 rays using a silicon reference solar cell provided with a KG-5 filter (Fraunhoffer Institute, Germany.) The photoelectric properties of all the samples were measured at a light intensity of 100 mW/cm$^2$ using global AM-1.5 rays. The results are given in Table 4.

TABLE 4

| Substrate | Electrolyte | No | Voltage (Voc) (V) | Fill factor (ff) (%) | Photocurrent density (mA/cm$^2$) | Photoelectric conversion (η) (%) |
|---|---|---|---|---|---|---|
| Glass substrate | Liquid | Comp. Ex. 1 | 0.747 | 69.6 | 13.09 | 6.81 |
| | | Comp. Ex. 2 | 0.722 | 68.8 | 13.61 | 6.76 |
| | | Comp. Ex. 3 | 0.709 | 68.0 | 16.51 | 7.98 |
| | | Ex. 1 | 0.767 | 69.2 | 15.29 | 8.12 |
| | | Ex. 2 | 0.730 | 68.9 | 17.03 | 8.57 |
| | | Ex. 3 | 0.741 | 68.5 | 17.20 | 8.73 |
| | | Ex. 4 | 0.776 | 66.5 | 17.52 | 9.04 |
| | | Ex. 5 | 0.784 | 68.5 | 20.25 | 10.90 |
| | | Ex. 7 | 0.771 | 68.3 | 21.09 | 11.11 (9.54*) |
| | Gel | Ex. 6 | 0.775 | 66.7 | 18.54 | 9.58 (8.82*) |
| | | Ex. 7 | 0.783 | 67.9 | 19.01 | 10.10 (8.75*) |
| | | Ex. 8 | 0.784 | 69.0 | 20.35 | 11.01 (8.80*) |
| Plastic substrate | Liquid | Comp. Ex. 11 | 0.710 | 68.2 | 8.41 | 4.07 |
| | | Comp. Ex. 12 | 0.721 | 69.7 | 8.53 | 4.27 |
| | | Ex. 11 | 0.718 | 68.5 | 9.21 | 4.53 |
| | | Ex. 12 | 0.717 | 66.6 | 9.86 | 4.71 |
| | | Ex. 13 | 0.722 | 68.4 | 10.31 | 5.09 |
| | | Ex. 14 | 0.778 | 68.5 | 13.83 | 7.37 |
| | Gel | Comp. Ex. 11 | 0.670 | 65.1 | 7.11 | 3.10 |
| | | Comp. Ex. 12 | 0.671 | 66.0 | 7.31 | 3.24 |
| | | Ex. 14 | 0.769 | 65.9 | 13.65 | 6.91 |

*Photoelectric conversion efficiency measured after masked

From Table 4, it can be seen that the solar cell prepared using an electrospray method or an electrospinning method exhibited more excellent performance than the solar cell prepared using a paste in terms of photocurrent density and photoelectric conversion efficiency. In particular, the solar cells of Examples 1 and 11 using a liquid electrolyte were more excellent than those of Comparative Examples 1 and 11 using a liquid electrolyte, respectively.

The inventive solar cell prepared without any added organic binder exhibited more excellent performance than the conventional solar cell prepared with an added organic binder in terms of photocurrent density and photoelectric conversion efficiency. In particular, the solar cells of Examples 1 and 11 using a liquid electrolyte were more excellent than those of Comparative Examples 1 and 11 using a liquid electrolyte, respectively.

Further, the solar cell prepared using a micro bead mill exhibited more excellent performance than the solar cell prepared using a ball mill and ultrasonic waves in terms of photocurrent density and photoelectric conversion efficiency. In particular, the solar cell of Example 11 using a liquid electrolyte was more excellent than that of Comparative Example 12 using a liquid electrolyte.

Figure 12:
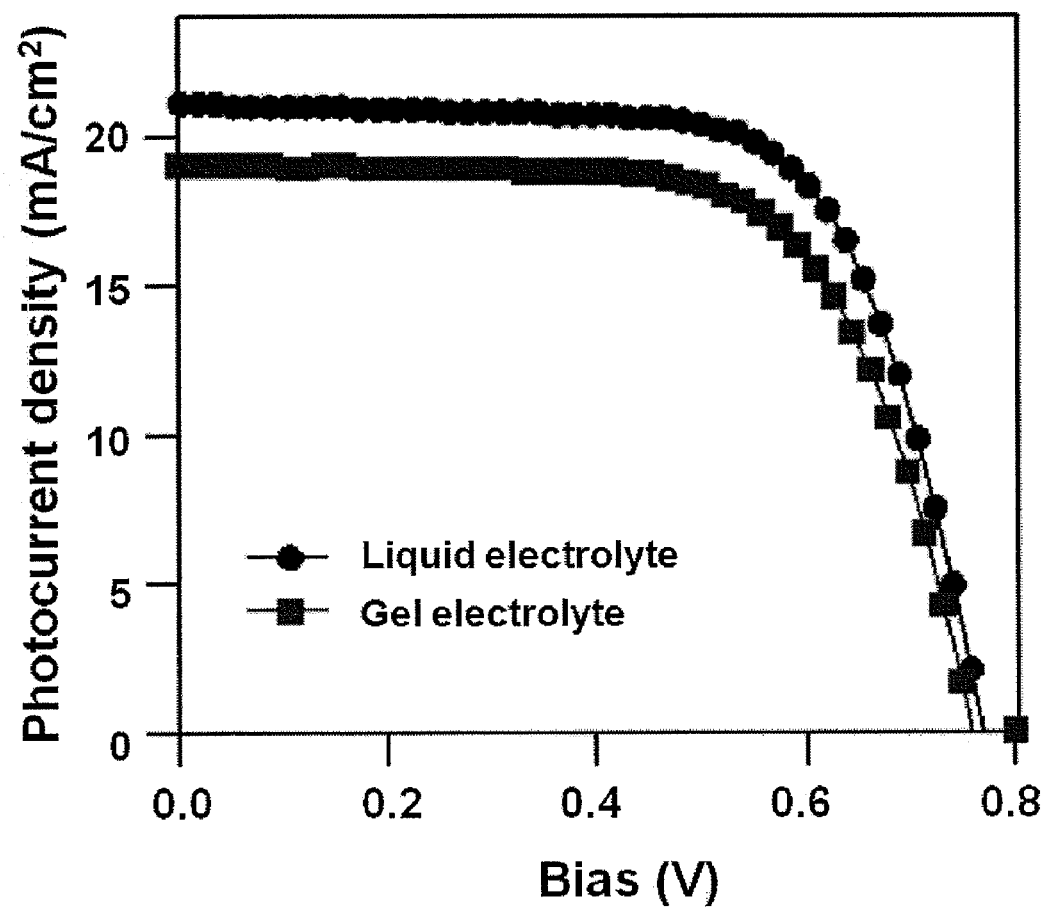
FIG. 12: the photocurrent densities of the solar cells of Example 7 prepared using a liquid electrolyte and a gel electrolyte, respectively.

Further, the solar cell prepared according to the inventive method has can maintain a high photoelectric conversion efficiency even when a gel or solid electrolyte is used instead of a liquid electrolyte. In particular, the photoelectric conversion efficiency of the solar cell of Comparative Example 11 using a gel electrolyte was about 76% of that of the solar cell prepared using a liquid electrolyte, whereas, the photoelectric conversion efficiencies of the solar cells of Examples 7 and 14 using a gel electrolyte were about 90 to 95% of those of the solar cells prepared using a liquid electrolyte. This result can also be seen from FIG. 12 which shows the photocurrent densities of the solar cells prepared using a liquid electrolyte and a gel electrolyte, respectively.

Moreover, the solar cell exhibited more excellent photoelectric properties when it is prepared using a mixed solvent of ethanol and butanol, 1 wt % metal oxide dispersion, mesoporous nanoparticles and/or nanorods, or a rutile titanium oxide layer coating.

Figure 10:
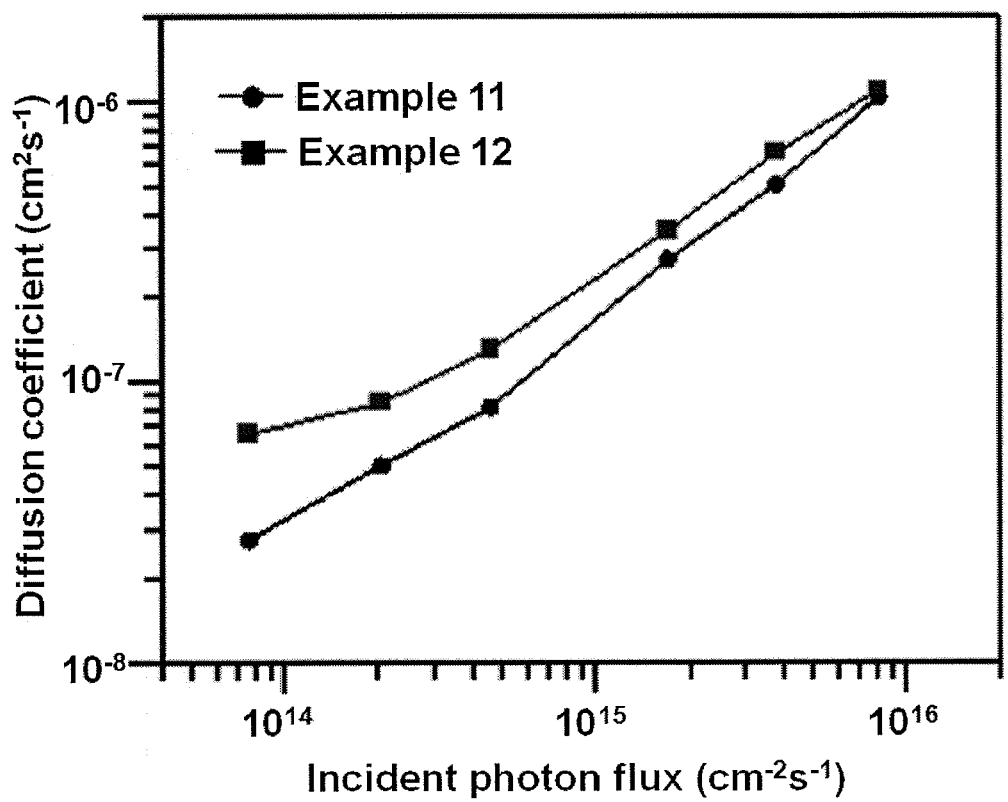
FIG. 10: the electron transport properties of the dye-sensitized solar cells comprising the titanium oxide layers of Examples 11 and 12.
Figure 10:
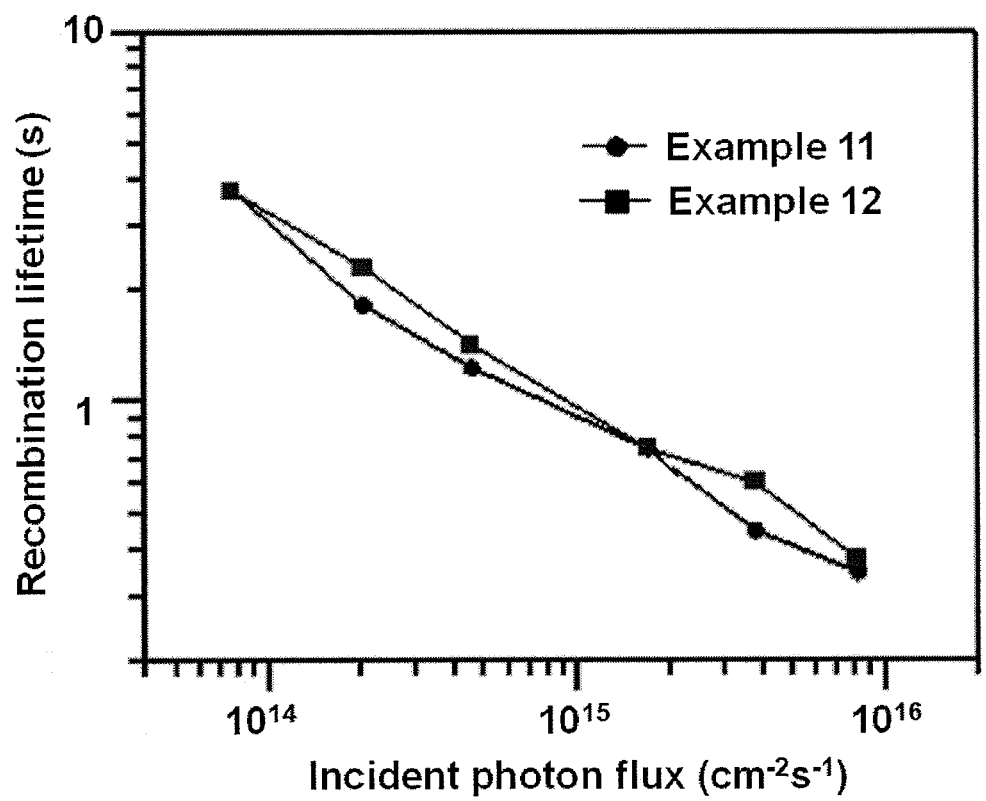

Furthermore, the solar cell comprising the titanium oxide layer subjected to a thermal pressing exhibited more excellent photoelectric properties. FIG. 10 shows the electron transport properties of the dye-sensitized solar cells of Examples 11 and 12. It can be seen from FIG. 10 that the electron transport property of the solar cell of Example 12 is more excellent than that of Example 11, which results from excellent contact property between particles and a low interface resistance of the inventive titanium oxide layer.

Figure 11:
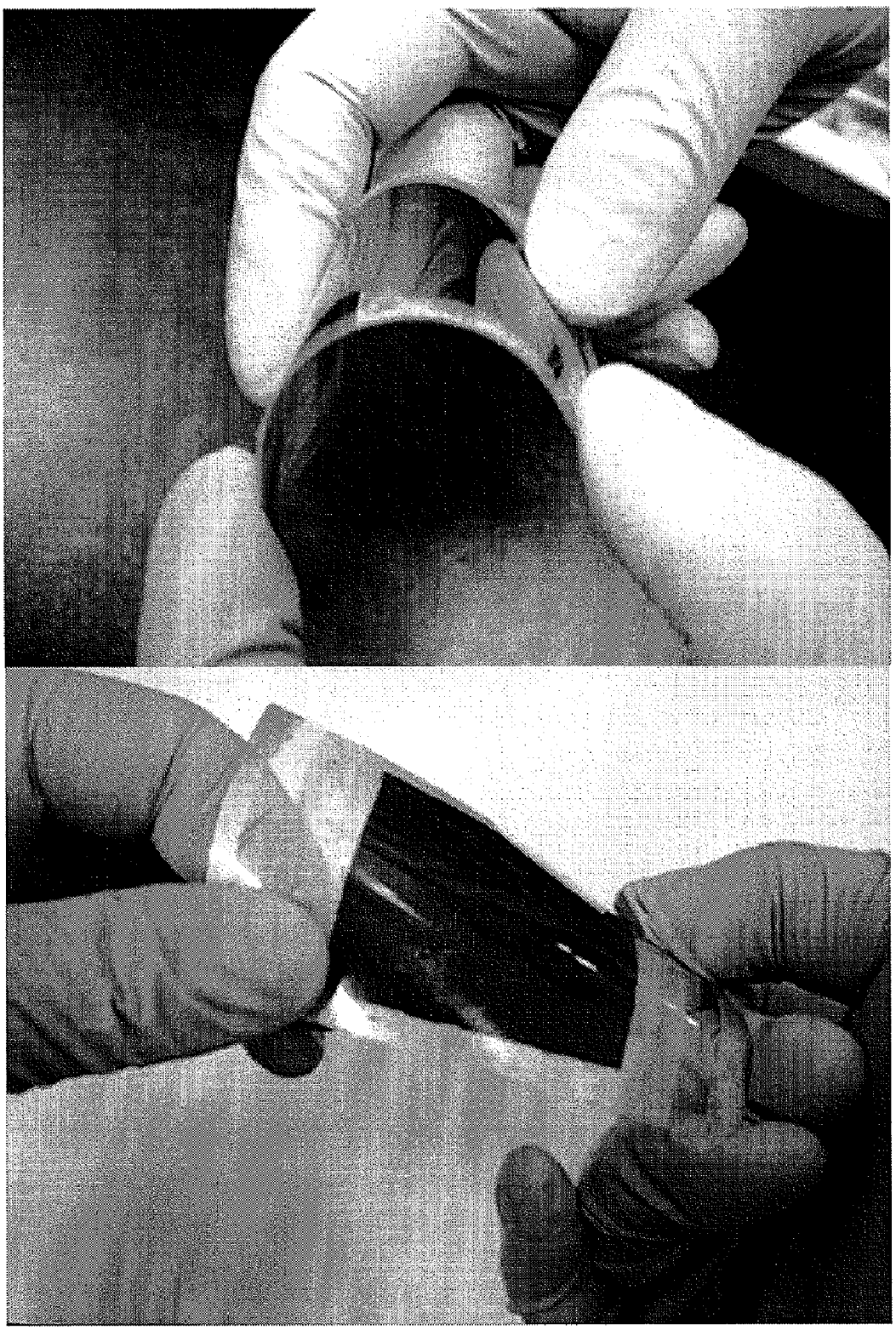
FIG. 11: the adhesive force of the titanium oxide layer prepared in Example 12.

Meanwhile, FIG. 11 shows the adhesive force of the titanium oxide layer prepared in Example 12. It can be seen from FIG. 11 that an electrode formed of a metal oxide layer is very strongly attached to a plastic substrate although a sintering process was conducted at a low-temperature and any organic binder was not added to the metal oxide layer.

In conclusion, it can be seen that the metal oxide layer according to the present invention has a high porosity, an improved specific surface area, and a high dye adsorptivity, and that the solar cell comprising the inventive metal oxide layer exhibited more excellent photoelectric properties than a conventional solar cell, even when a gel electrode is used.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a dye-sensitized solar cell, comprising the steps of preparing a semiconductor electrode, preparing a counter electrode, and charging an electrolyte between said two electrodes, wherein the preparation of the semiconductor electrode comprises:
   (a) preparing a metal oxide dispersion by dispersing metal oxide nanoparticles in an organic solvent in an amount of 0.01 to 5 wt %, without any added organic binder;
   (b) electrospraying the metal oxide dispersion on a conductive substrate to form metal oxide nanoballs having an average diameter of 50 to 3000 nm and a specific surface area of 70 to 300 m$^2$/g which are agglomerated metal oxide nanoparticles disposed on the conductive substrate;
   (c) thermal-pressing the conductive substrate coated with the metal oxide nanoballs at a temperature of 50 to 200° C. under a pressure of 0.1 to 25 tons per 100 cm$^2$;
   (d) heat-treating the thermal-pressed conductive substrate coated with the metal oxide nanoballs at a temperature of 100 to 700° C. to prepare a metal oxide nanoball layer formed on the conductive substrate; and
   (e) conducting the absorption of a dye on the metal oxide nanoball layer.

2. The method of claim 1, wherein the metal oxide dispersion of step (a) is prepared by dispersing the metal oxide nanoparticles in the organic solvent uniformly using a micro bead mill.

3. The method of claim 1, wherein the organic solvent used in step (a) is a mixed solvent composed of ethanol mixed with a solvent having a dielectric constant less than that of ethanol and having a boiling point of 80 to 150° C., in a weight ratio of 1:3 to 3:1.

4. The method of claim 3, wherein the mixed solvent is a mixture of ethanol and butanol in a weight ratio of 1:3 to 3:1.

5. The method of claim 1, wherein the content of the metal oxide nanoparticles of the metal oxide dispersion of step (a) is 0.01 to 3 wt %.

6. The method of claim 1, wherein the metal oxide nanoparticles of step (a) have an average diameter of 1 to 50 nm, an aspect ratio of 1 to 100, and a specific surface area of 10 to 300 m$^2$/g, and are selected from the group consisting of mesoporous nanoparticles, hollow nanoparticles, nanorods, nanotubes, nanofibers, and a mixture thereof.

7. The method of claim 1, wherein the metal oxide nanoparticles of step (a) are nanoparticles of a metal oxide selected from the group consisting of titanium oxide, zinc oxide, tin oxide, niobium oxide, tungsten oxide, strontium oxide, zirconium oxide, and a mixture thereof.

8. The method of claim 1, wherein the metal oxide nanoparticles are anatase titanium oxide nanoparticles, and the metal oxide nanoball layer of step (c) is further coated with a rutile titanium oxide nanoparticle layer.

9. The method of claim 1, wherein the conductive substrate of step (b) is a conductive glass substrate or a metal substrate, and the heat-treatment of step (c) is conducted at a temperature of 400 to 700° C.

10. The method of claim 1, wherein the conductive substrate of step (b) is a transparent conductive plastic substrate, and the heat-treatment of step (c) is conducted at a temperature of 100 to 250° C.

11. The method of claim 1, wherein the electrolyte is a liquid electrolyte, a gel electrolyte, or a solid electrolyte.

12. A dye-sensitized solar cell prepared by the method according to claim 1, comprising a semiconductor electrode, a counter electrode, and an electrolyte charged between said two electrodes, wherein the semiconductor electrode has a metal oxide nanoball layer comprising mesoporous nanoballs which are agglomerated metal oxide nanoparticles and have an average diameter of 50 to 3000 nm and a specific surface area of 70 to 300 m$^2$/g.

13. The dye-sensitized solar cell of claim 12, wherein the metal oxide nanoball layer has a porosity of 70 to 90%.

14. A method for preparing a dye-sensitized solar cell, the method comprising:
   dispersing metal oxide nanoparticles in an organic solvent in an amount of about 0.01 to about 5 wt % in which the organic solvent is without any added organic binder;
   electrospraying the metal oxide dispersion onto a conductive substrate to coat metal oxide nanoballs onto the conductive substrate wherein the metal oxide nanoballs have an average diameter of between about 50 to 3000 nm and a specific surface area of between about 70 to 300 m$^2$/g;
   thermal-pressing the conductive substrate coated with the metal oxide nanoballs at a temperature of 50 to 200° C. under a pressure of between about 0.1 to 25 tons per 100 cm$^2$;
   heat-treating the thermal-pressed conductive substrate coated with the metal oxide nanoballs at a temperature of between about 100 to 700° C. to prepare a metal oxide nanoball layer on the conductive substrate; and adsorbing a dye onto the metal oxide nanoball layer.

15. The method for preparing a dye-sensitized solar cell of claim 14, wherein the dispersing, electrospraying, thermal-pressing, heat-treating, and adsorbing steps comprise preparing a semiconductor electrode for the dye-sensitized solar cell.

16. The method for preparing a dye-sensitized solar cell of claim 14, further comprising:

preparing a counter electrode by forming an electrically conductive coating layer onto another conductive substrate, wherein the coating layer is selected from the group consisting of a platinum layer, a carbon particle layer, a carbon nanofiber layer, a carbon nanotube layer, a graphene monolayer, a graphene multilayer, a conductive polymer layer and a combination thereof.

17. The method for preparing a dye-sensitized solar cell of claim 15, further comprising:

placing a spacer between the counter electrode and a semiconductor electrode made from the dispersing, electrospraying, thermal-pressing, heat-treating, and adsorbing steps; and charging the dye-sensitized solar cell with an electrolyte between the semiconductor electrode and the counter electrode.

18. The method for preparing a dye-sensitized solar cell of claim 15, wherein the metal oxide nanoballs comprise titanium oxide nanoballs.

19. The method for preparing a dye-sensitized solar cell of claim 15, further comprising:

immersing the metal oxide nanoball layer with an aqueous $TiCl_4$ solution at about 40° C. for about 4 hours to obtain a titanium oxide nanoball layer coated with a rutile titanium oxide layer wherein the immersing step is performed subsequent to the heat-treating step and prior to the adsorbing step.

20. The method for preparing a dye-sensitized solar cell of claim 15, wherein the metal oxide nanoball layer is comprises anatase titanium oxide nanorods coated with rutile titanium oxide.

* * * * *